US012509664B2

(12) United States Patent
Kim et al.

(10) Patent No.: US 12,509,664 B2
(45) Date of Patent: Dec. 30, 2025

(54) CARBON MONOXIDE DEHYDROGENASE HAVING EXCELLENT OXYGEN RESISTANCE AND ENZYME ACTIVITY, AND USE THEREOF

(71) Applicant: UNIST(ULSAN NATIONAL INSTITUTE OF SCIENCE AND TECHNOLOGY), Ulsan (KR)

(72) Inventors: Yong Hwan Kim, Ulsan (KR); Suk Min Kim, Ulsan (KR); Jin Hee Lee, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 418 days.

(21) Appl. No.: 18/006,563

(22) PCT Filed: Aug. 27, 2020

(86) PCT No.: PCT/KR2020/011468
§ 371 (c)(1),
(2) Date: Jan. 23, 2023

(87) PCT Pub. No.: WO2022/019372
PCT Pub. Date: Jan. 27, 2022

(65) Prior Publication Data
US 2023/0323313 A1 Oct. 12, 2023

(30) Foreign Application Priority Data
Jul. 24, 2020 (KR) .................. 10-2020-0092551

(51) Int. Cl.
*C12N 9/02* (2006.01)
*A62D 3/02* (2007.01)
(Continued)

(52) U.S. Cl.
CPC ............. *C12N 9/0008* (2013.01); *A62D 3/02* (2013.01); *B01D 53/84* (2013.01); *C12N 15/70* (2013.01);
(Continued)

(58) Field of Classification Search
CPC ................................... C12N 9/0008
See application file for complete search history.

(56) References Cited

U.S. PATENT DOCUMENTS 10,240,170 B2    3/2019   Kim et al.

FOREIGN PATENT DOCUMENTS

KR    10-2013-0055048 A    5/2013
KR    10-2017-0036789 A    4/2017
(Continued)

OTHER PUBLICATIONS

Fransceus. J Ind Microbiol Biotechnol. May 2017;44(4-5):687-695.*
(Continued)

*Primary Examiner* — Yong D Pak
(74) *Attorney, Agent, or Firm* — Klarquist Sparkman, LLP

(57) ABSTRACT

Provided is a carbon monoxide (CO) dehydrogenase with increased oxygen resistance and/or enzyme activity, specifically, a mutant CO dehydrogenase with increased oxygen resistance and/or enzyme activity by mutating amino acid residues. The CO dehydrogenase may detoxify toxic carbon monoxide at room temperature and pressure by easily oxidizing carbon monoxide and converting the same into carbon dioxide, and may effectively oxidize carbon monoxide even in gas including oxygen. Furthermore, since it is possible to remove carbon monoxide, which is emitted in large quantities in industries such as petrochemical and steel industries, cigarette burning, household cooking, various
(Continued)

boilers, and combustion, through cigarette filters, air purifiers, intake filters in household cooking equipment, gas boilers, etc. the CO dehydrogenase may be utilized in various ways.

11 Claims, 1 Drawing Sheet

Specification includes a Sequence Listing.

(51) Int. Cl.
 *B01D 53/84* (2006.01)
 *C12N 15/70* (2006.01)
(52) U.S. Cl.
 CPC .................. *B01D 2257/502* (2013.01); *C12Y 102/02004* (2013.01)

(56) References Cited

FOREIGN PATENT DOCUMENTS

| KR | 10-2018-0005712 A | 1/2018 |
| KR | 10-1826207 B1 | 2/2018 |
| WO | WO 2016/025096 A1 | 2/2016 |

OTHER PUBLICATIONS

Sanavia. Computational and Structural Biotechnology Journal, vol. 18, 2020, pp. 1968-1979.*

Studer. Residue mutations and their impact on protein structure and function: detecting beneficial and pathogenic changes. Biochem. J. (2013) 449, 581-594.*

English Translation of KR 10-1826207 retrieved from Google Translate on May 8, 2025.*

Bond et al., "RF-Cloning.org: an online tool for the design of restriction-free cloning projects," *Nucleic Acids Research*, vol. 40:W209-W213, (published online May 8, 2012).

Choi et al., "Expression and characterization of Pantoea CO dehydrogenase to utilize CO-containing industrial waste gas for expanding the versatility of CO dehydrogenase," *Scientific Reports* 7:44323, 10 pages (Mar. 14, 2017).

Domnik et al., "CODH-IV: A High-Efficiency CO-Scavenging CO Dehydrogenase with Resistance to $O_2$," *Angew. Chem. Int. Ed.* 56:15466 -15469 (Nov. 2, 2017).

International Search Report and Written Opinion for PCT/KR2020/011468 dated Apr. 16, 2021, plus English translation of International Search Report, 15 pages.

Jetten et al., "Purification and characterization of an oxygen-stable carbon monoxide dehydrogenase of Methanothrix soehngenii," *Eur. J. Biochem.* 181:437-441 (May 1989).

Lee et al., "In-Silico Based Redesign of CO-Dehydrogenase Catalyzing the Oxidation of Toxic Waste CO Gas for Improved $O_2$ Resistance and Mediator Affinity," Enzyme Engineering XXV, ECI Symposium Series, Sep. 15-19, 2019, abstract, 1 page.

Office Action for related Korea Patent Application No. KR 10-2020-0092551 dated Nov. 16, 2021, plus English translation of Office Action, 12 pages.

Takahashi et al., "Functional Assignment of the ORF2-*iscS-iscU-iscA-hscB-hscA-fdx*-ORF3 Gene Cluster Involved in the Assembly of Fe-S Clusters in *Escherichia coli*," J. Biochem. 126(5):917-926 (Nov. 1, 1999).

Wittenborn et al., "The Solvent-Exposed Fe-S D-cluster Contributes to Oxygen-Resistance in D. vulgaris Ni-Fe Carbon Monoxide Dehydrogenase," *ACS Catalysis*, just accepted manuscript, 25 pages (published online Jun. 4, 2020).

Written Decision on Registration for related Korea Patent Application No. KR 10-2020-0092551 dated Nov. 4, 2022, plus English translation of Written Decision, 8 pages.

* cited by examiner

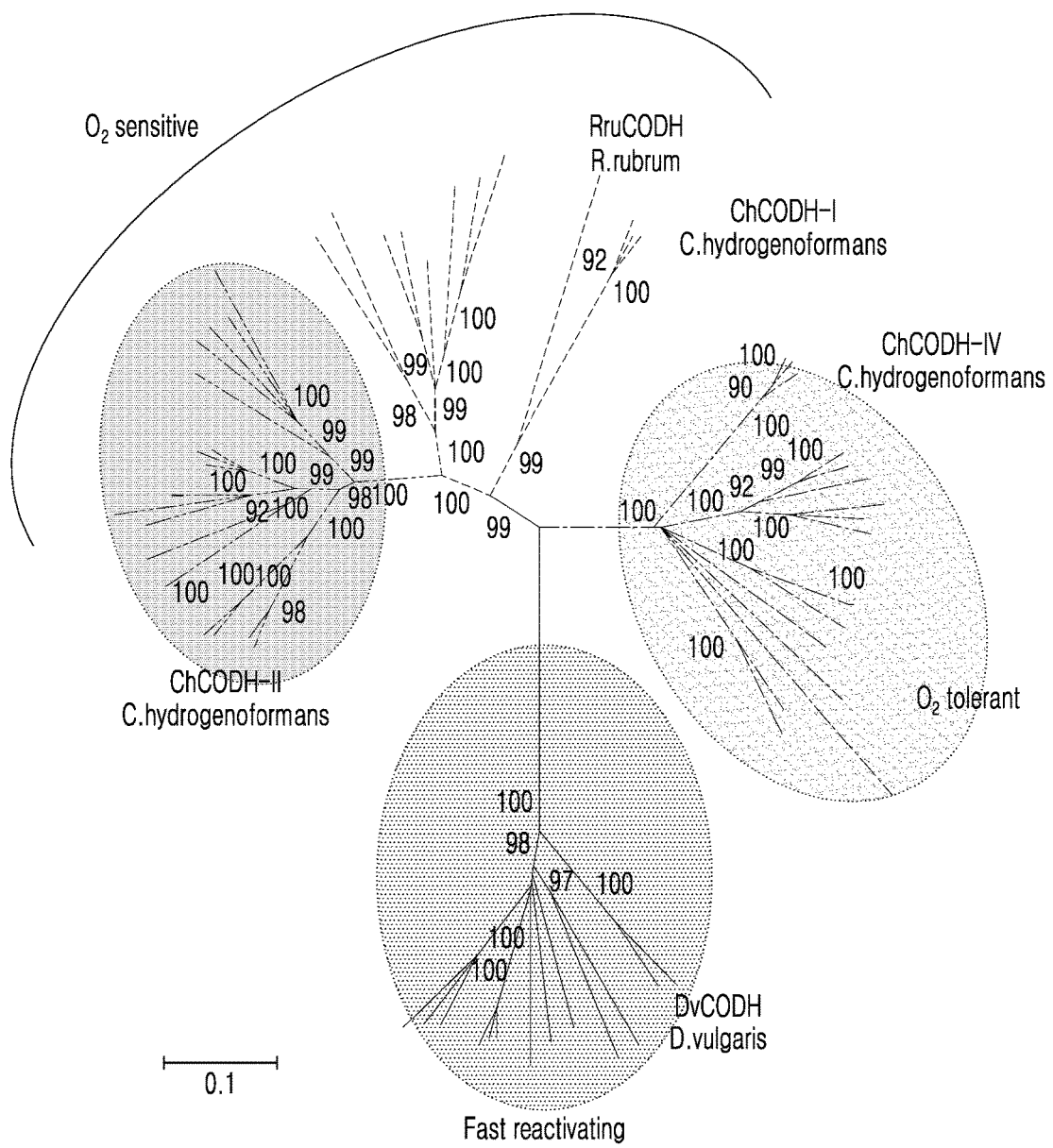

The phylogenetic trees show the orthologous relationships based on amino sequences of the CODH proteins. The sequences alignments were performed with the ClustalW 1.4 program, and the trees were constructed using MEGA 6 software with the neighbor-joining me thod (1,000 replicates). Bootstrap values (>90%) are displayed at the branch points. Abbreviations: ChCODH-I, Carboxydothermus hydrogenoformans (WO11344718); ChCODH-II, C.hydrogenoformans (WP011343033); ChCODH-IV, C.hydrogenoformans (WO11343666); DvCODH, Desulfovibrio vulgaris (WP010939375);RruCODH, Rhodospirillum rubrum (WO11389181).

CARBON MONOXIDE DEHYDROGENASE HAVING EXCELLENT OXYGEN RESISTANCE AND ENZYME ACTIVITY, AND USE THEREOF

CROSS REFERENCE TO RELATED APPLICATIONS

This is the U.S. National Stage of International Application No. PCT/KR2020/011468, filed Aug. 27, 2020, which claims the benefit of Korean Application No. 10-2020-0092551, filed Jul. 24, 2020.

TECHNICAL FIELD

Reference to an Electronic Sequence Listing

The contents of the electronic sequence listing (9022-109615-01 ST25 Listing.txt; Size: 90,049 bytes; and generated on Jan. 23, 2023) is herein incorporated by reference in its entirety.

The present disclosure relates to a carbon monoxide dehydrogenase having excellent oxygen resistance and/or enzyme activity, and a use thereof.

BACKGROUND ART

A considerable amount of carbon monoxide is generated due to incomplete combustion of carbon in homes and industrial sites. Carbon monoxide exhibits a property of binding to hemoglobin proteins of red blood cells in the blood with an affinity much higher than that of oxygen. For this reason, when air containing carbon monoxide of a certain concentration or more is inhaled, oxygen deficiency causes blood vessel damage and in the worst case, unconsciousness or death, due to an increase in heart rate and a subsequent increase in blood pressure. Therefore, it is necessary to convert toxic carbon monoxide contained in the air into harmless carbon dioxide by simply oxidizing the same at room temperature and pressure.

In particular, for cigarettes, while carbon dioxide accounts for 9% to 14% (45 mg to 65 mg/1 cigarette) of the gas inhaled by smokers, carbon monoxide accounts for 2.8% to 4.6% (14 mg to 23 mg/1 cigarette). Since carbon monoxide is generated and inhaled at such a high rate, carbon monoxide becomes a factor posing a fatal threat to health of smokers and secondhand smokers. Cigarette filters have adsorbents such as activated carbon, but the existing adsorbents do not have specificity and performance sufficient to adsorb carbon monoxide, and carbon monoxide is not effectively removed.

On the other hand, a carbon monoxide dehydrogenase (CO dehydrogenase: CODH) is one of metabolic enzymes in microorganisms, and is an enzyme capable of converting highly toxic carbon monoxide gas into carbon dioxide by oxidizing carbon monoxide at room temperature and pressure (see Scheme 1 below). In this regard, it is a unique characteristic that water molecules are used as electron acceptors instead of oxygen as electron acceptors, and in the oxidation of carbon monoxide, oxygen molecules are not required but water molecules are required.

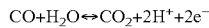
$CO + H_2O \leftrightarrow CO_2 + 2H^+ + 2e^-$ [Scheme 1]

A CO dehydrogenase known to date has an advantage of having a very high unit activity of the enzyme, but has an issue of rapidly decreasing its enzymatic activity due to being extremely vulnerable to oxygen molecules in the air. Most of the waste gas containing carbon monoxide also contains oxygen even at a low concentration, and an attempt to oxidatively convert CO included in the waste gas by using the CO dehydrogenase failed to successfully achieve the desired goal, due to the rapid decrease of the activity of the CO dehydrogenase by oxygen molecules included in the waste gas.

Accordingly, the present inventors have developed a CO dehydrogenase having excellent oxygen resistance as well as excellent enzyme activity.

DESCRIPTION OF EMBODIMENTS

Technical Problem

An aspect is to provide a carbon monoxide (CO) dehydrogenase with increased oxygen resistance and/or enzyme activity.

Another aspect is to provide a polynucleotide encoding the CO dehydrogenase with increased oxygen resistance and/or enzyme activity.

Still another aspect is to provide a vector expressing the CO dehydrogenase with increased oxygen resistance and/or enzyme activity.

Still another aspect is to provide a microorganism expressing the CO dehydrogenase with increased oxygen resistance and/or enzyme activity.

Still another aspect is to provide a method of preparing the CO dehydrogenase including culturing the microorganism expressing the polynucleotide encoding the CO dehydrogenase with increased oxygen resistance and/or enzymatic activity.

Still another aspect is to provide a method of removing carbon monoxide including contacting carbon monoxide with the CO dehydrogenase with increased oxygen resistance and/or enzyme activity.

Still another aspect is to provide a method of preparing carbon dioxide including contacting carbon monoxide with the CO dehydrogenase with increased oxygen resistance and/or enzyme activity.

Still another aspect is to provide a device for removing carbon monoxide including the CO dehydrogenase with increased oxygen resistance and/or enzyme activity.

Still another aspect is to provide a filter including the CO dehydrogenase with increased oxygen resistance and/or enzyme activity.

Solution to Problem

An aspect provides a carbon monoxide (CO) dehydrogenase with increased oxygen resistance and/or enzyme activity.

The oxygen resistance refers to an ability of the CO dehydrogenase to retain activity even under the presence of oxygen, specifically, the oxygen resistance may be confirmed by measuring activity of the CO dehydrogenase after contacting the enzyme with oxygen of a certain concentration.

In addition, the oxygen resistance may be confirmed by measuring the maximum oxygen concentration that the enzyme activity retains 20% to 80%, 20% to 70%, 20% to 60%, 30% to 80%, 30% to 70%, 30% to 60%, 40% to 80%, 40% to 70%, or 40% to 60% of the initial activity.

In an embodiment, the CO dehydrogenase may have oxygen resistance increased 1 to 200 times, 1 to 150 times, 1 to 125 times, 50 times to 200 times, 50 times to 150 times, 50 times to 125 times, 75 times to 200 times, 75 times to 150 times, or 75 times to 125 times compared to a wild type CO dehydrogenase.

The enzyme activity refers to activity of the CO dehydrogenase catalyzing the reaction of Scheme 1 below:

$$CO+H_2O \leftrightarrow CO_2+2H^++2e^-.$$ [Scheme 1]

The activity of the CO dehydrogenase may be confirmed by measuring carbon dioxide, hydrogen ions, or electrons generated by contacting carbon monoxide and water with the CO dehydrogenase.

In an embodiment, the CO dehydrogenase may have activity thereof increased 1 to 200 times, 1 to 150 times, 1 to 125 times, 50 times to 200 times, 50 times to 150 times, 50 times to 125 times, 75 times to 200 times, 75 times to 150 times, or 75 times to 125 times compared to the wild type CO dehydrogenase.

The CO dehydrogenase may be derived from nature or obtained through various protein synthesis methods widely known in the art. For example, the carbon monoxide dehydrogenase may be prepared by using polynucleotide recombination and a protein expression system, or prepared by an in vitro synthesis method through chemical synthesis such as protein synthesis, and a cell-free protein synthesis method. In addition, as an example, the CO dehydrogenase may be a peptide, an extract of a plant-derived tissue or cells, or a product obtained by culturing a microorganism (for example, bacteria or fungi, and particularly yeast).

The term "protein" refers to a polymer composed of two or more amino acids linked by amide bonds (or peptide bonds).

The CO dehydrogenase may include a protein having sequence homology of about 70% or more, about 75% or more, about 80% or more, about 85% or more, about 90% or more, about 92% or more, about 95% or more, about 97% or more, about 98% or more, or about 99% or more with an amino acid sequence of an existing CO dehydrogenase. For example, the CO dehydrogenase may be an isoenzyme of an existing CO dehydrogenase. Specifically, the CO dehydrogenase may be derived from *Moorella thermoacetica, Rhodospirillum rubrum, Carboxydothermus hydrogenoformans, Methanococcus vannielii, Methanosarcina barkeri, Methanothermobacter thermautotrophicus, Clostridium pasteurianum, Oligotropha carboxidovorans, Aeropyrum pernix, Ferroglobus placidus, Clostridium autoethanogenum, Clostridium ragsdalei, Clostridium ljungdahlii, Clostridium scatologenes, Clostridium acetobutylicum, Clostridium beijerinckii, Clostridium perfringens, Clostridium thermocellum, Clostridium kluyveri,* or *Clostridium botulinum,* more specifically, the CO dehydrogenase may be derived from *Carboxydothermus hydrogenoformans,* or more specifically, when the CO dehydrogenase is a CO dehydrogenase-2 (CODH-2) derived from a wild type *Carboxydothermus hydrogenoformans,* the CO dehydrogenase may be a protein encoded by a polynucleotide consisting of a nucleotide sequence of SEQ ID NO: 1, and when the CO dehydrogenase is a CO dehydrogenase-4 (CODH-4) derived from a wild type *Carboxydothermus hydrogenoformans,* the CO dehydrogenase may be a protein encoded by a polynucleotide consisting of a nucleotide sequence of SEQ ID NO: 2.

In addition, the CO dehydrogenase may be one CO dehydrogenase selected from the group consisting of CO dehydrogenase-1 (CODH-1), CO dehydrogenase-2 (CODH-2), CO dehydrogenase-3 (CODH-3), and CO dehydrogenase-4 (CODH-4), or specifically, CO dehydrogenase-2 (CODH-2), or CO dehydrogenase-4 (CODH-4), or more specifically, a protein encoded by a polynucleotide consisting of a nucleotide sequence of SEQ ID NO: 1 or 2.

The term "homology" is for indicating a degree of similarity with a wild type amino acid sequence, and comparison of such homology may be performed by using a program for comparison widely known in the art, and homology between two or more sequences may be calculated as percentage (%).

In addition, in order to obtain better chemical stability, enhanced pharmacological properties (half-life, absorption, titer, efficacy, etc.), altered specificity (for example, broad biological activity spectrum), and reduced antigenicity, the N-terminus or C-terminus of the CO dehydrogenase may be bound to a protecting group. The protecting group may be an acetyl group, a fluorenyl methoxycarbonyl group, a formyl group, a palmitoyl group, a myristyl group, a stearyl group, or polyethylene glycol (PEG), but any component that may enhance the CO dehydrogenase, particularly a component that may enhance stability of the CO dehydrogenase, may be included without limitation.

The term "stability" may mean storage stability (for example, storage stability at room temperature) as well as in vivo stability that protects the CO dehydrogenase from attack of proteolytic enzymes in vivo.

In addition, the CO dehydrogenase may additionally include a targeting sequence, a tag, and an amino acid sequence prepared for a specific purpose for a labeled residue, specifically, the CO dehydrogenase may be in a form bound to a protein with a His-tag terminus expressed in pET-28 (SEQ ID NO: 3) plasmids.

In an example, the CO dehydrogenase may have at least one amino acid modified, wherein the amino acid is selected from the group consisting of the 82nd (position 82) amino acid, 559th (position 559) amino acid, 565th (position 565) amino acid, 578th (position 578) amino acid, 580th (position 580) amino acid, 586th (position 586) amino acid, 593rd (position 593) amino acid, 597th (position 597) amino acid, and 610th (position 610) amino acid of the CO dehydrogenase.

In addition, in an example, the modification may be at least one selected from the group consisting of deletion, addition, and substitution, and one amino acid may be modified, or two or more amino acids may be modified.

In an embodiment, the 82nd amino acid of the CO dehydrogenase may be leucine, the 559th amino acid of the CO dehydrogenase may be alanine, and the 565th amino acid of the CO dehydrogenase may be valine, the 578th amino acid of the CO dehydrogenase may be threonine, the 580th amino acid of the CO dehydrogenase may be isoleucine, the 586th amino acid of the CO dehydrogenase may be isoleucine, the 593rd amino acid of the CO dehydrogenase may be threonine, the 597th amino acid may be threonine, and the 610th amino acid of the CO dehydrogenase may be valine.

In addition, in an embodiment, when the modification is substitution, the substituted amino acid may be at least one amino acid selected from the group consisting of tryptophan, tyrosine, serine, histidine, aspartic acid, glutamic acid, asparagine, alanine, threonine, glutamine, leucine, and valine.

Specifically, leucine, which is the 82nd amino acid of the CO dehydrogenase, may be substituted with serine or valine; alanine, the 559th amino acid of the CO dehydrogenase, may be substituted with tryptophan, tyrosine, serine, histidine, aspartic acid, glutamic acid, asparagine, threonine, or glutamine; valine, the 565th amino acid of the CO dehydrogenase, may be substituted with alanine, serine or leucine; threonine, the 578th amino acid of the CO dehydrogenase, may be substituted with serine; isoleucine, the 580th amino acid of the CO dehydrogenase, may be substituted with leucine; isoleucine, the 586th amino acid of the CO dehydrogenase, may be substituted with serine; threonine, the 593rd amino acid of the CO dehydrogenase, may be substituted with serine; threonine, the 597th amino acid of the CO dehydrogenase, may be substituted with serine; valine, the 610th amino acid of the CO dehydrogenase, may be substituted with alanine or serine, and the substitution may be substitution of one amino acid, or substitution of two or more amino acids.

More specifically, the CO dehydrogenase may be a protein encoded by a polynucleotide consisting of one nucleotide sequence selected from the group consisting of the nucleotide sequences of SEQ ID NOS: 24 to 43.

Another aspect provides a polynucleotide encoding the CO dehydrogenase with increased oxygen resistance and/or enzyme activity.

The "oxygen resistance", "enzyme activity" or "CO dehydrogenase" may be within the above-described range.

The polynucleotide means a plurality of nucleotides continuously linked, and the polynucleotide may express a CO dehydrogenase.

The term "expression" refers to a process by which a polypeptide is produced from a structural gene. The process involves transcription of genes (polynucleotides) into mRNA, and translation of these mRNAs into polypeptide (protein) (s).

The term "polynucleotide encoding an enzyme" refers to a polynucleotide encoding an enzyme, or a polynucleotide further including additional coding and/or non-coding sequences.

When the CO dehydrogenase is a CO dehydrogenase-2 (CODH-2) derived from a wild type *Carboxydothermus hydrogenoformans*, the CO dehydrogenase may be a protein encoded by a polynucleotide consisting of a nucleotide sequence of SEQ ID NO: 1, and when the CO dehydrogenase is a CO dehydrogenase-4 (CODH-4) derived from a wild type *Carboxydothermus hydrogenoformans*, the CO dehydrogenase may be a protein encoded by a polynucleotide consisting of a nucleotide sequence of SEQ ID NO: 2.

In addition, specifically, the polynucleotide encoding the CO dehydrogenase with increased oxygen resistance and/or enzyme activity may be a polynucleotide consisting of one nucleotide sequence selected from the group consisting of nucleotide sequences of SEQ ID NOS: 24 to 43.

Still another aspect provides a vector expressing the CO dehydrogenase with increased oxygen resistance and/or enzyme activity.

The "oxygen resistance", "enzyme activity", "CO dehydrogenase", or "expression" may be within the above-described range.

The term "vector" refers to a means for expressing a gene of interest in host cells. Vectors may replicate DNA and reproduce independently in host cells. For example, the vectors include plasmid vectors, cosmid vectors, and viral vectors such as bacteriophage vectors, adenoviral vectors, retroviral vectors, and adeno-associated viral vectors.

The vector expressing the CO dehydrogenase may be a recombinant vector, and a vector that may be used as a recombinant vector may be prepared by manipulating plasmids (for example, pSC101, pGV1106, pACYC177, ColE1, pKT230, pME290, pBR322, pUC8/9, pUC6, pBD9, pHC79, plJ61, pLAFR1, pHV14, pGEX series, pET series (including pET-28), pUC19, etc.), phages, or viruses (for example, SV40) often used in the art, or specifically, the vector may be pET-28 (SEQ ID NO: 3).

The term "recombinant vector" includes any cloning or expression vector containing the cloned gene(s) of interest.

The term "recombinant" describes a cell that replicates a heterologous nucleic acid, expresses the nucleic acid, or expresses a peptide, a heterologous peptide, or a protein encoded by a heterologous nucleic acid. A recombinant cell may express a gene or a gene fragment not found in a natural form of the cell, either as a sense or antisense strand. In addition, recombinant cells may express genes found in cells in their natural state, but the genes are modified and have been reintroduced into cells by artificial means.

In the recombinant vector, a polynucleotide encoding the enzyme may be operably linked to a promoter.

The term "operably linked" refers to a functional linkage between a regulatory sequence of nucleotide expression (for example, a promoter sequence) and another nucleotide sequence. Such a regulatory sequence may be "operably linked" to regulate transcription and/or translation of other nucleotide sequences.

The recombinant vector may typically be constructed as a vector for cloning or a vector for expression. As the expression vector, vectors commonly used in the art to express exogenous proteins from plants, animals, or microorganisms may be used. The recombinant vector may be constructed through various methods known in the art.

The recombinant vector may be constructed by using prokaryotic or eukaryotic cells as hosts. For example, when the vector used is an expression vector and prokaryotic cells are used as hosts, it is common to include a strong promoter capable of advancing transcription (for example, CMV promoter, trp promoter, lac promoter, tac promoter, T7 promoter, etc.), a ribosome binding site for initiation of translation, and a transcription/translation termination sequence. When eukaryotic cells are used as hosts, an origin of replication operating in the eukaryotic cells is included in the vector, wherein the origin of replication includes, but is limited to, an f1 origin of replication, an SV40 origin of replication, a pMB1 origin of replication, an adeno origin of replication, an AAV origin of replication and a BBV origin of replication, etc. In addition, promoters derived from the genome of mammalian cells (for example, metallothionine promoter) or promoters derived from mammalian viruses (for example, adenovirus late promoter, vaccinia virus 7.5K promoter, SV40 promoter, cytomegalovirus promoter, and tk promoter of HSV) may be used, and the promoters usually have a polyadenylation sequence as a transcription termination sequence.

In an embodiment, when the gene encoding the CO dehydrogenase introduced in the recombinant vector encodes a CO dehydrogenase-2 (CODH-2) derived from a wild type *Carboxydothermus hydrogenoformans*, the recombinant vector may be a polynucleotide consisting of a nucleotide sequence of SEQ ID NO: 4, and when the gene encoding the CO dehydrogenase introduced in the recombinant vector encodes a CO dehydrogenase-4 (CODH-4) derived from a wild type *Carboxydothermus hydrogenoformans*, the recombinant vector may be a polynucleotide consisting of a nucleotide sequence of SEQ ID NO: 5.

Another aspect provides a microorganism expressing the CO dehydrogenase with increased oxygen resistance or enzyme activity.

The "oxygen resistance", "enzyme activity", "CO dehydrogenase", or "expression" may be within the above-described range.

The microorganism may be a recombinant microorganism, and the microorganism may be obtained by introducing the recombinant vector into an appropriate host microorganism. The microorganism may be any host cell known in the art as a cell capable of stably and continuously cloning or expressing the recombinant vector, prokaryotic host cells include, for example, *E. coli* JM109, *E. coli* BL21, *E. coli* RR1, *E. coli* LE392, *E. coli* B, *E. coli* X 1776, *E. coli* W3110, *Bacillus* strains such as *Bacillus subtilis, Bacillus thuringiensis*, and *Salmonella typhimurium, Serratia marcessons*, and various *Pseudomonas* species, etc., and when eukaryotic cells are transformed, yeasts (Saccharomyce scerevisiae), insect cells, plant cells and animal cells such as Sp2/0, CHO (Chinese hamster ovary) K1, CHO DG44, PER.C6, W138, BHK, COS-7, 293, HepG2, Huh7, 3T3, RIN, MDCK cell lines, etc. may be used as host cells, and specifically, the microorganism may be *E. coli* BL21.

Another aspect provides a method of preparing the CO dehydrogenase including culturing a microorganism expressing a polynucleotide encoding the CO dehydrogenase with increased oxygen resistance and/or enzyme activity.

The "oxygen resistance", "enzyme activity", "CO dehydrogenase", "expression", or "microorganism" may be within the above-described range.

The culturing may be a known culturing method in the art, and specifically, may further include introducing into the microorganism a plasmid expressing a protein for labeling a CO dehydrogenase.

In an embodiment, the preparation method may further include treating a substance capable of promoting expression of CO dehydrogenases and isolating and purifying the proteins.

The CO dehydrogenase prepared by the above preparation method may exhibit excellent enzyme activity even in the presence of oxygen.

Another aspect provides a method of removing carbon monoxide including contacting carbon monoxide with the CO dehydrogenase with increased oxygen resistance and/or enzyme activity.

The "oxygen resistance", "enzyme activity", "CO dehydrogenase", or "expression" may be within the above-described range.

Through the above contact, carbon monoxide reacts with water and is transformed into carbon dioxide, hydrogen ions, and electrons, and thus, carbon monoxide may be removed, and carbon monoxide may be removed with excellent efficiency even in the presence of oxygen.

Another aspect provides a method of preparing carbon dioxide, including contacting carbon monoxide with the CO dehydrogenase having increased oxygen resistance and/or enzymatic activity.

The "oxygen resistance", "enzyme activity", "CO dehydrogenase", or "expression" may be within the above-described range.

Through the above contact, carbon monoxide reacts with water and is transformed into carbon dioxide, hydrogen ions, and electrons, and thus, carbon dioxide may be prepared, and carbon dioxide may be prepared with excellent efficiency even in the presence of oxygen.

Still another aspect is to provide a device for removing carbon monoxide including the CO dehydrogenase with increased oxygen resistance and/or enzyme activity.

The "oxygen resistance", "enzyme activity", "CO dehydrogenase", or "expression" may be within the above-described range.

The CO dehydrogenase included in the device reacts carbon monoxide with water to transform it into carbon dioxide, hydrogen ions, and electrons, so that carbon monoxide may be removed, and carbon monoxide may be removed with excellent efficiency even in the presence of oxygen.

The device may be applied in industrial sites where technology for treating harmful gas is required, purification technology and system for sterilization/removal of harmful substances in the air, treatment facilities and related technologies for indoor air quality management in vehicles and trains, technology and device for ventilation efficiency and economic ventilation, and indoor air purifiers such as air purifiers, air conditioners, and ventilators.

Still another aspect provides a filter including the CO dehydrogenase with increased oxygen resistance and/or enzyme activity.

The "oxygen resistance", "enzyme activity", "CO dehydrogenase", or "expression" may be within the above-described range.

The CO dehydrogenase included in the filter reacts carbon monoxide with water to transform it into carbon dioxide, hydrogen ions, and electrons, so that carbon monoxide may be removed, and carbon monoxide may be removed with excellent efficiency even in the presence of oxygen.

The filter may be applied to various filters such as cigarette filters and air purifier filters in places where carbon monoxide is generated, and furthermore, the filter may be used in industrial sites where technology for treating harmful gas is required, purification technology and system for sterilization/removal of harmful substances in the air, treatment facilities and related technologies for indoor air quality management in vehicles and trains, technology and device for ventilation efficiency and economic ventilation, and indoor air purifiers such as air purifiers, air conditioners, and ventilators.

Advantageous Effects of Disclosure

A carbon monoxide (CO) dehydrogenase according to an aspect has increased oxygen resistance and/or enzyme activity, and the CO dehydrogenase may detoxify toxic carbon monoxide at room temperature and pressure by easily oxidizing carbon monoxide and converting the same into carbon dioxide, and may effectively oxidize carbon monoxide even in gas including oxygen. Furthermore, since it is possible to remove carbon monoxide, which is emitted in large quantities during combustion in industries such as petrochemical and steel industries, cigarette burning, household cooking, and various boilers, through cigarette filters, air purifiers, intake filters in household cooking equipment, gas boilers, etc. the CO dehydrogenase may be utilized in various ways.

BRIEF DESCRIPTION OF DRAWINGS

FIG. 1 shows phylogenetic trees based on protein sequences of CO dehydrogenase enzymes.

FIG. 2 is a diagram showing comparisons of protein sequences of CO dehydrogenase enzymes.

MODE OF DISCLOSURE

Hereinafter, the present disclosure will be described in more detail through examples. However, these examples are intended to illustrate the present disclosure, and the scope of the present disclosure is not limited to these examples.

EXAMPLE

1. Drawing Phylogenetic Trees of Carbon Monoxide Dehydrogenases (CODH)

Phylogenetic trees as shown in FIG. 1 were drawn based on sequence information of CO dehydrogenases known to date.

Among the shown, the most active CO dehydrogenase is ChCODH-II derived from *Carboxydothermus hydrogenoformans*, which is more than 100 times more active than ChCODH-IV, which is known to have oxygen resistance, but is known to lose activity very quickly in the presence of oxygen due to not being resistant to oxygen.

2. Sequence Comparison of Various CO Dehydrogenases

Sequences of various CO dehydrogenase enzymes, including ChCODH-II and ChCODH-IV, were compared with each other to determine key residues predicted to be mainly related to oxygen resistance.

L82 (Leucine 82), A559 (Alanine 559), V565 (Valine 565), T578 (Threonine 578), and I580 (Isoleucine 580) were determined as residues expected to be related to oxygen stability in ChCODH-II through sequence comparison of CO dehydrogenases (CODHs). Among the residues, A559, with which an enzyme activity was measured, showed a fairly high activity as a result of an initial experiment, so a mutant including the residue was made preferentially, and additional mutants were prepared by adding other sites thereto to conduct experiments.

3. Production of Mutants of Carbon Monoxide Dehydrogenase (CODH)

An oxygen-resistant CO dehydrogenase (CODH) and a recombinant microorganism containing the same were prepared.

(1) Wild Type Carbon Monoxide Dehydrogenase

Genes (SEQ ID NOS: 1 and 2) encoding ChCODH-2 and ChCODH-4 proteins derived from *C. hydrogenoforman* (GenBank no. NC_007503) were artificially synthesized by GenScript (Piscataway, NJ, USA) to use as a genetic mutation template of an oxygen-resistant CO dehydrogenase.

The synthesized *C. hydrogenoforman*-derived ChCODH-2 or ChCODH-4 gene was digested with NdeI/BamHI or NdeI/XhoI restriction enzymes (New England BioLabs Inc., US) at 37° C. for 20 minutes, and cloned into an expression vector pET-28 (Novagen, USA, SEQ ID NO: 3) by using a SolGent™ T4 DNA ligase. The vectors (SEQ ID NOS: 4 and 5) containing the CO dehydrogenase gene were introduced into *Escherichia coli* BL21 by heat shock (42° C., 1 minute) to prepare a recombinant microorganism containing a wild type CO dehydrogenase.

(2) Oxygen-Resistant CO Dehydrogenase

Site-directed mutagenesis was proceeded for single or multiple amino acid substitutions by using the synthesized wild type ChCODH-2 as a template, to synthesize various candidate oxygen-resistant CO dehydrogenase variants, and the vector containing a CO dehydrogenase variant was introduced into *E. coli* BL21 as in Example 3.-(1) to prepare a recombinant microorganism containing a CO dehydrogenase variant.

Information on primers used in the synthesis of the CO dehydrogenase variants is shown in Table 1 below.

TABLE 1

| Substituted amino acid | Primer | Inserted vector | SEQ ID NO |
|---|---|---|---|
| A559W | F-5'gcgcggcggaatggatgcatgagaaggcggtgg R-5'tctcatgcatccattccgccgcgctcgcaacc | pET28a | 6 7 |
| A559Y | F-5'gcgcggcggaatacatgcatgagaaggcggtgg R-5'tctcatgcatgtattccgccgcgctcgcaacc | | 8 9 |
| A559S | F-5'cgcggcggaaagcatgcatgagaaggcggtgg R-5'tctcatgcatgctttccgccgcgctcgcaacc | | 10 11 |
| A559H | F-5'cgcggcggaacacatgcatgagaaggcggtgg R-5'tctcatgcatgtgttccgccgcgctcgcaacc | | 12 13 |
| A559D | F-5'cgcggcggaagatatgcatgagaaggcggtgg R-5'tctcatgcatatcttccgccgcgctcgcaacc | | 14 15 |
| A559E | F-5'cgcggcggaagagatgcatgagaaggcgg R-5'tctcatgcatctcttccgccgcgctcgcaa | | 16 17 |
| A559N | F-5'gcgcggcggaaaacatgcatgagaaggcggtgg R-5'tctcatgcatgttttccgccgcgctcgcaacc | | 18 19 |
| V610A | F-5'gctacttcatcgcggaactggaccggagacc R-5'ggtccagttccgcgatgaagtagccaccgg | | 20 21 |
| V610S | F-5'gctacttcatcagcgaactggaccggagacc R-5'ggtccagttcgctgatgaagtagccaccgg | | 22 23 |
| A559W/V610A | A559W F&R; V610A F&R | | — |
| A559W/V610S | A559W F&R; V610S F&R | | — |
| A559S/V610A | A559S F&R; V610A F&R | | — |
| A559S/V610S | A559S F&R; V610S F&R | | — |
| A559H/V610A | A559H F&R; V610A F&R | | — |
| A559H/V610S | A559H F&R; V610S F&R | | — |

4. Expression and Purification of Oxygen-Resistant CO Dehydrogenase

In order to obtain oxygen-resistant CO dehydrogenases derived from the recombinant microorganism, pET-28 (SEQ ID NO: 3) expression vector was used to synthesize an expression vector containing a CO dehydrogenase variant with a His-tag terminus. The synthesized expression vector of a CO dehydrogenase variant was introduced into *E. coli* BL21 containing pRKISC (J. Biochem. 126:917, 1999) plasmids to complete the final recombinant microorganisms, which were each cultured to induce expression of CO dehydrogenases in a form of a protein with a His-tag terminus, and then, the CO dehydrogenases were purified.

The culturing of the recombinant *E. coli* was carried out in TB medium (400 mL, 2 L flask) including 50 µg/mL of kanamycin, 10 µg/mL of tetracycline, 0.02 mM of nickel chloride ($NiCl_2$), 0.1 mM of ferrous sulfate ($FeSO_4$), and 2 mM of L-cysteine, aerobically under the condition of 225 rpm at 37° C.

Thereafter, after an optical density (OD) value reached about 0.4 to about 0.6, 0.2 mM of isopropyl-β-d-thiogalactopyranoside (IPTG), 0.5 mM of nickel chloride ($NiCl_2$), 1 mM of ferrous sulfate ($FeSO_4$), and 50 mM of potassium nitrate ($KNO_3$) were each added to a $N_2$-fluxed serum bottle, to induce expression of the enzyme. In this regard, the temperature was lowered to 30° C.

After culturing for 24 hours, recombinant *E. coli* was obtained by centrifugation at 12,000 rpm for 30 minutes at 4° C., and the enzyme was purified by using Ni-NTA resin in an anaerobic chamber.

5. Measurement of Activity of CO Dehydrogenase

CO oxidation reaction activity of the CO dehydrogenase was measured by an oxidation-reduction reaction of ethyl viologen (EV) by the enzyme in a reaction buffer at 30° C. saturated with carbon monoxide by using spectrophotometry (578 nm).

The reaction was performed by using a screw cap cuvette with a carbon monoxide headspace, in this regard, the reaction solution (2 mL) included 20 mM of oxidized ethyl viologen and 50 mM of HEPES/NaOH buffer (pH 8) saturated with carbon monoxide, and the reaction began by injection of the enzyme, and measured for 2 minutes. Here, one unit of CO dehydrogenase activity is defined as an amount of enzyme required for reduction reaction of 1 mmol of oxidized ethyl viologen at a temperature of 30° C. and a pH of 8.

6. Measurement of Oxygen Stability of CO Dehydrogenase

Oxygen stability of the CO dehydrogenase was measured by first reacting the enzyme with oxygen at a concentration of 0 mM to 250 mM for 1 minute, and then measuring the residual activity of the enzyme by measuring oxidation-reduction reaction of ethyl viologen (EV) by the oxygen-exposed enzyme by using spectrophotometry (578 nm) as in Example 5.

7. Measurement of Activity and Oxygen Resistance of Single Mutant of CO Dehydrogenase Results of measuring activity and oxygen resistance of the wild type and mutants of ChCODH-II derived from *Carboxydothermus hydrogenoformans* are shown in Table 2 below. Oxygen resistance was expressed as the maximum oxygen concentration at which an activity of the enzyme was maintained at 50% of the initial activity.

TABLE 2

| CODH type | SEQ ID NO | Activity (U/mg) | Oxygen concentration for maintaining enzyme activity (mM) |
|---|---|---|---|
| Wild type ChCODH-II | 1 | 1,000 | 1 |
| Wild type ChCODH-IV | 2 | 100 | 25 |
| ChCODH-II A559W | 24 | 3,000 | 25 |
| ChCODH-II A559Y | 25 | 800 | 20 |
| ChCODH-II A559S | 26 | 1,000 | 50 |
| ChCODH-II A559T | 27 | 0 | 0 |
| ChCODH-II A559N | 28 | 200 | <5 |
| ChCODH-II A559Q | 29 | 400 | <1 |
| ChCODH-II A559H | 30 | 10,000 | 50 |
| ChCODH-II A559D | 31 | 400 | <5 |
| ChCODH-II A559E | 32 | 300 | <5 |

As a result of the experiment, as may be seen in Table 2 above, ChCODH-II A559W and A559H showed significantly excellent characteristics in terms of increased activity and oxygen resistance. Therefore, in subsequent studies, studies were conducted to increase oxygen resistance by introducing additional mutated residues.

8. Measurement of Activity and Oxygen Resistance of Double Mutant of CO Dehydrogenase The results of measuring activity and oxygen resistance of the wild type and mutants of ChCODH-II derived from *Carboxydothermus hydrogenoformans* are shown in Table 3 below. Oxygen resistance was expressed as the maximum oxygen concentration at which an activity of the enzyme was maintained at 50% of the initial activity.

TABLE 3

| CODH type | SEQ ID NO | Activity (U/mg) | Oxygen concentration for maintaining enzyme activity (mM) |
|---|---|---|---|
| Wild type ChCODH-II | 1 | 1,000 | 1 |
| Wild type ChCODH-IV | 2 | 100 | 25 |
| ChCODH-II A559W | 24 | 3,000 | 25 |
| ChCODH-II A559W:V565A | 33 | 100 | 0 |
| ChCODH-II A559W:V565S | 34 | 500 | <10 |
| ChCODH-II A559Y:V565L | 35 | 1,500 | <10 |
| ChCODH-II A559W:T578S | 36 | 1,500 | <10 |
| ChCODH-II A559W:L82S | 37 | 2,000 | <50 |
| ChCODH-II A559W:L82V | 38 | 1,000 | <50 |
| ChCODH-II A559Y:I580L | 39 | 500 | 1 |
| ChCODH-II A559H | 30 | 10,000 | 50 |
| ChCODH-II A559H:I586S | 40 | 2,000 | <25 |
| ChCODH-II A559H:T593S | 41 | 3,000 | <25 |
| ChCODH-II A559H:T597S | 42 | 3,000 | <50 |
| ChCODH-II A559H:V610S | 43 | 1,000 | 100 |

As results of the experiment, as shown in Table 3, for the A559H: V610S double mutant, an oxygen concentration at which emzymatic activity was maintained at 50% reached 100 mM, and increased about 100 times compared to the wild type ChCODH-II, and the double mutant showed about 4 times higher oxygen resistance than the wild type ChCODH-IV, which is a wild type with the highest oxygen resistance known to date, and showed a characteristic that the enzyme activity is increased about 10 times compared to the wild type ChCODH-IV.

In addition, the double mutant showed oxygen resistance twice as high as that of ChCODH-II A559H, which had the highest oxygen resistance among the single mutants.

The invention claimed is:

1. A carbon monoxide (CO) dehydrogenase with increased oxygen resistance and/or enzyme activity, wherein the CO dehydrogenase is a protein encoded by a polynucleotide having a nucleotide sequence according to one of SEQ ID NOs: 24, 26, 30, 35-38, or 40-43.

2. The CO dehydrogenase of claim 1, wherein the oxygen resistance is increased 1 to 200 times compared to a wild type CO dehydrogenase.

3. The CO dehydrogenase of claim 1, wherein the enzyme activity is increased 1 to 200 times compared to the wild type CO dehydrogenase.

4. A polynucleotide encoding the CO dehydrogenase of claim 1.

5. A vector expressing the CO dehydrogenase of claim 1.

6. A microorganism expressing the CO dehydrogenase of claim 1.

7. A method of preparing the CO dehydrogenase comprising culturing the microorganism expressing the polynucleotide encoding the CO dehydrogenase of claim 1.

8. A method of removing carbon monoxide comprising contacting carbon monoxide with the CO dehydrogenase of claim 1.

9. A method of preparing carbon dioxide comprising contacting carbon monoxide with the CO dehydrogenase of claim 1.

10. A device for removing carbon monoxide comprising the CO dehydrogenase of claim 1.

11. A filter comprising the CO dehydrogenase of claim 1.

* * * * *

SEQUENCE LISTING

```
<160> NUMBER OF SEQ ID NOS: 43

<210> SEQ ID NO 1
<211> LENGTH: 1911
<212> TYPE: DNA
<213> ORGANISM: Unknown
<220> FEATURE:
<223> OTHER INFORMATION: Carboxydothermus hydrogenoformans
<220> FEATURE:
<221> NAME/KEY: gene
<222> LOCATION: (1)..(1911)
```

<223> OTHER INFORMATION: CARBON MONOXIDE DEHYDROGENASE-2

<400> SEQUENCE: 1

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaagacgag      420
gatattgcgc tggaagttgc gaaagcggcg ctggcggact ccatgagaa agataccccg      480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg gtggcctgc gttgcagcct ggcggacctg      660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg      840
cgtgcggcg gtgcgaccgg tatcaacgtg gttggtattt gctgcaccgg caacgaggtg      900
ctgatgcgtc acggtattcc ggcgtgcacc cacagcgtta gccaggaaat ggcgatgatc     960
accgcgcgc tggacgcgat gatcctggat tatcagtgca ttcaaccgag cgtggcgacc    1020
attgcggagt gcaccggtac caccgttatt accaccatgg aaatgagcaa atcaccggt    1080
gcgacccatg tgaactttgc ggaggaagcg gcggttgaga cgcgaagca aatcctgcgt    1140
ctggcgattg atacctttaa acgtcgtaag ggtaaaccgg tggagatccc gaacattaag    1200
accaaagtgg ttgcgggctt cagcaccgaa gcgatcatta cgcgctgag caagctgaac    1260
gcgaacgatc cgctgaaacc gctgattgac aacgtggtta acggtaacat ccgtggcgtg    1320
tgcctgttcg cggggtgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggca acgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaagcgatg    1680
catgagaagg cggtggcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911
```

<210> SEQ ID NO 2
<211> LENGTH: 1902
<212> TYPE: DNA
<213> ORGANISM: Unknown
<220> FEATURE:
<223> OTHER INFORMATION: Carboxydothermus hydrogenoformans
<220> FEATURE:
<221> NAME/KEY: gene
<222> LOCATION: (1)..(1902)
<223> OTHER INFORMATION: CARBON MONOXIDE DEHYDROGENASE-4

<400> SEQUENCE: 2

```
atggataaaa gcaagttatc agtagatcct gtgatcccga atttatatcg taaagccaga      60
gaggaaggga tttccactgt ttttgatcgt tatgaagcac agcagcctca gtgcggattt     120
gggcttacag gcctttgctg tcgtcattgc gtgcagggac cgtgccgcat agatccgttt     180
ggggaaggac cgcaagcggg catttgcggt gctaccgccg aggtaataac ggctcgcaat     240
ctgctgcgtc aagtcacggc gggtgctgcc gcccatgtag accatgcgta tgatgtgctg     300
gaagttttgg aacaaatcgc caaggtacg gaatcataca gtatcaaaga tcaagaaaag      360
ttaaagcagg tcgcttttac cttaggtata gataccgcta acaaaacaga gcaggagatt     420
gttgaagaga tgtgccaaat tatctatcgg gattttgcca attctggtgc aacaccgatg     480
acctatctga agccaactc tcctcgggaa cgccttgaga catgggaaaa attaggggtt      540
ctgcctcgta acccagaccg tgaaatcaga gaagccttac accagactac aatggggatg     600
gatgcggacc cagtaaattt aatcttaaaa actattcgcc ttggtctggt tgatggtttt     660
gcgggtctca agttagcgac ggatttacag gacatcattt ttggcactcc ccagccagtt     720
gtcacagaag caaatctggg tgtactcaaa gaagattatg tgaatatcat agtccacggc     780
catgttccgt tacttagcga aaaaattgtt gaatggagca gaaagttgga agatgaggcg     840
aaaaaagcag gggcaaaagg aatcaatctt gcaggtatat gttgtactgg taacgaggtg     900
ttaatgcgtc agggtgtacc gttagcaaca aacttcctgg cccaggagtt ggcgattatt     960
acgggggcag ttgacttaat ggtagtggat gttcagtgta ttatgccctc attagcagaa    1020
attgctgctt gctatcatac ccgcttagtc actaccatgc cgattgtgaa aattccaggt    1080
gcggagcatg ttccgttcac cacagaaact gccgatgagg cctcgcagca gattgtgcgt    1140
atggctatag agagttacca aaaacgcaat ccagccaagg tctacatccc cagggaaaaa    1200
gccaaagttg tagcaggatt cagcgttgag gcaatagtaa aagcgttagc gaaactaaat    1260
cctgacgatc cgttaaagcc cttaattgat aatattgtgt ctggcaacat tctgggtgtg    1320
gtcgccaccg ttggttgtaa caatgtgaag gtcaagcatg attggttcca catagaatta    1380
gtaaaagaac taattaaaaa caatgtgtta gtggtgacta caggctgttc cgctcatgcg    1440
ttagcgaaag caggcttgat ggaccccgca gcagccgaat gggctggcga gggtttacga    1500
gccgtcttaa cggcaatagg cacggctaat gatttgggcg gcccgctgcc gcctgttttg    1560
cacatgggat cgtgtgttga taactcccga atcggggact tagtgatcgc cgtcgcaaac    1620
taccttaaag taagtccaaa agaccttccg attgcggctt ctgcacctga ataccagcat    1680
gaaaaggctt tgagcatcgg aacctgggcg gtagcgatgg gtattatgac ccacttggga    1740
gttgttccac ctgtggtcgg aagttcaaaa gttacccgta ttcttaccca agatgccgag    1800
gctttaatag gcggcaaatt ttatgtggaa acggacccat ataaagcagc agcgggcatc    1860
attgaacata ttaaggctaa acgggctcta ctgaatttat aa                        1902
```

<210> SEQ ID NO 3
<211> LENGTH: 5369
<212> TYPE: DNA
<213> ORGANISM: Artificial Sequence
<220> FEATURE:
<223> OTHER INFORMATION: pET-28

<400> SEQUENCE: 3

```
atccggatat agttcctcct ttcagcaaaa aacccctcaa gacccgttta gaggccccaa      60
ggggttatgc tagttattgc tcagcggtgg cagcagccaa ctcagcttcc tttcgggctt     120
tgttagcagc cggatctcag tggtggtggt ggtggtgctc gagtgcggcc gcaagcttgt     180
cgacggagct cgaattcgga tccgcgaccc atttgctgtc caccagtcat gctagccata     240
tggctgccgc gcggcaccag gccgctgctg tgatgatgat gatgatggct gctgcccatg     300
gtatatctcc ttcttaaagt taaacaaaat tatttctaga ggggaattgt tatccgctca     360
caattcccct atagtgagtc gtattaattt cgcgggatcg agatctcgat cctctacgcc     420
ggacgcatcg tggccggcat caccggcgcc acaggtgcgg ttgctggcgc ctatatcgcc     480
gacatcaccg atgggaaga tcgggctcgc cacttcgggc tcatgagcgc ttgtttcggc     540
gtgggtatgg tggcaggccc cgtggccggg ggactgttgg gcgccatctc cttgcatgca     600
ccattccttg cggcggcggt gctcaacggc ctcaacctac tactgggctg cttcctaatg     660
caggagtcgc ataagggaga cgtcgagat cccggacacc atcgaatggc gcaaaacctt     720
tcgcggtatg gcatgatagc gcccggaaga gagtcaattc agggtggtga atgtgaaacc     780
agtaacgtta tacgatgtcg cagagtatgc cggtgtctct tatcagaccg tttccgcgt     840
ggtgaaccag gccagccacg tttctgcgaa aacgcgggaa aaagtggaag cggcgatggc     900
ggagctgaat tacattccca accgcgtggc acaacaactg gcgggcaaac agtcgttgct     960
gattggcgtt gccacctcca gtctggccct cacgcgccg tcgcaaattg tcgcggcgat    1020
taaatctcgc gccgatcaac tgggtgccag cgtggtggtg tcgatggtag aacgaagcgg    1080
cgtcgaagcc tgtaaagcgg cggtgcacaa tcttctcgcg caacgcgtca gtgggctgat    1140
cattaactat ccgctggatg accaggatgc cattgctgtg gaagctgcct gcactaatgt    1200
tccggcgtta tttcttgatg tctctgacca gacacccatc aacagtatta ttttctccca    1260
tgaagacggt acgcgactgg gcgtggagca tctggtcgca ttgggtcacc agcaaatcgc    1320
gctgttagcg ggcccattaa gttctgtctc ggcgcgtctg cgtctggctg gctggcataa    1380
atatctcact cgcaatcaaa ttcagccgat agcggaacgg gaaggcgact ggagtgccat    1440
gtccggtttt caacaaacca tgcaaatgct gaatgagggc atcgttccca ctgcgatgct    1500
ggttgccaac gatcagatgg cgctgggcgc aatgcgcgcc attaccgagt ccgggctgcg    1560
cgttggtgcg gatatctcgg tagtgggata cgacgatacc gaagacagct catgttatat    1620
cccgccgtta accaccatca aacaggattt tcgcctgctg gggcaaacca gcgtggaccg    1680
cttgctgcaa ctctctcagg ccaggcggt gaagggcaat cagctgttgc ccgtctcact    1740
ggtgaaaaga aaaaccaccc tggcgccaa tacgcaaacc gcctctcccc gcgcgttggc    1800
cgattcatta atgcagctgg cacgacaggt ttcccgactg gaaagcgggc agtgagcgca    1860
acgcaattaa tgtaagttag ctcactcatt aggcaccggg atctcgaccg atgcccttga    1920
gagccttcaa cccagtcagc tccttccggt gggcgcgggg catgactatc gtcgccgcac    1980
ttatgactgt cttctttatc atgcaactcg taggacaggt gccggcagcg ctctgggtca    2040
ttttcggcga ggaccgcttt cgctggagcg cgacgatgat cggcctgtcg cttgcggtat    2100
tcggaatctt gcacgccctc gctcaagcct tcgtcactgg tcccgccacc aaacgtttcg    2160
gcgagaagca ggccattatc gccggcatgg cggcccacg ggtgcgcatg atcgtgctcc    2220
tgtcgttgag gacccggcta ggctggcggg gttgccttac tggttagcag aatgaatcac    2280
```

```
cgatacgcga gcgaacgtga agcgactgct gctgcaaaac gtctgcgacc tgagcaacaa    2340
catgaatggt cttcggtttc cgtgtttcgt aaagtctgga aacgcggaag tcagcgccct    2400
gcaccattat gttccggatc tgcatcgcag gatgctgctg gctaccctgt ggaacaccta    2460
catctgtatt aacgaagcgc tggcattgac cctgagtgat ttttctctgg tcccgccgca    2520
tccataccgc cagttgttta ccctcacaac gttccagtaa ccgggcatgt tcatcatcag    2580
taacccgtat cgtgagcatc ctctctcgtt tcatcggtat cattacccccc atgaacagaa    2640 atccccctta cacggaggca tcagtgacca aacaggaaaa aaccgccctt aacatggccc    2700
gctttatcag aagccagaca ttaacgcttc tggagaaact caacgagctg gacgcggatg    2760
aacaggcaga catctgtgaa tcgcttcacg accacgctga tgagctttac cgcagctgcc    2820
tcgcgcgttt cggtgatgac ggtgaaaacc tctgacacat gcagctcccg gagacggtca    2880
cagcttgtct gtaagcggat gccgggagca gacaagcccg tcagggcgcg tcagcgggtg    2940
ttggcgggtg tcggggcgca gccatgaccc agtcacgtag cgatagcgga gtgtatactg    3000
gcttaactat gcggcatcag agcagattgt actgagagtg caccatatat gcggtgtgaa    3060
ataccgcaca gatgcgtaag gagaaaatac cgcatcaggc gctcttccgc ttcctcgctc    3120
actgactcgc tgcgctcggt cgttcggctg cggcgagcgg tatcagctca ctcaaaggcg    3180
gtaatacggt tatccacaga atcaggggat aacgcaggaa agaacatgtg agcaaaaggc    3240
cagcaaaagg ccaggaaccg taaaaaggcc gcgttgctgg cgtttttcca taggctccgc    3300 cccccctgacg agcatcacaa aaatcgacgc tcaagtcaga ggtggcgaaa cccgacagga    3360
ctataaagat accaggcgtt tccccctgga agctccctcg tgcgctctcc tgttccgacc    3420
ctgccgctta ccggatacct gtccgccttt ctcccttcgg gaagcgtggc gctttctcat    3480
agctcacgct gtaggtatct cagttcggtg taggtcgttc gctccaagct gggctgtgtg    3540
cacgaacccc ccgttcagcc cgaccgctgc gccttatccg gtaactatcg tcttgagtcc    3600
aacccggtaa gacacgactt atcgccactg gcagcagcca ctggtaacag gattagcaga    3660
gcgaggtatg taggcggtgc tacagagttc ttgaagtggt ggcctaacta cggctacact    3720
agaaggacag tatttggtat ctgcgctctg ctgaagccag ttaccttcgg aaaaagagtt    3780
ggtagctctt gatccggcaa acaaaccacc gctggtagcg gtggtttttt tgtttgcaag    3840
cagcagatta cgcgcagaaa aaaaggatct caagaagatc ctttgatctt ttctacgggg    3900
tctgacgctc agtggaacga aaactcacgt taagggattt tggtcatgaa caataaaact    3960
gtctgcttac ataaacagta atacaagggg tgttatgagc catattcaac gggaaacgtc    4020
ttgctctagg ccgcgattaa attccaacat ggatgctgat ttatatgggt ataaatgggc    4080
tcgcgataat gtcgggcaat caggtgcgac aatctatcga ttgtatggga agcccgatgc    4140
gccagagttg tttctgaaac atggcaaagg tagcgttgcc aatgatgtta cagatgagat    4200
ggtcagacta aactgctga cggaatttat gcctcttccg accatcaagc attttatccg    4260
tactcctgat gatgcatggt tactcaccac tgcgatcccc gggaaaacag cattccaggt    4320
attagaagaa tatcctgatt caggtgaaaa tattgttgat gcgctggcag tgttcctgcg    4380
ccggttgcat tcgattcctg tttgtaattg tccttttaac agcgatcgcg tatttcgtct    4440
cgctcaggcg caatcacgaa tgaataacgg tttggttgat gcgagtgatt ttgatgacga    4500
gcgtaatggc tggcctgttg aacaagtctg gaaagaaatg cataaacttt tgccattctc    4560
accggattca gtcgtcactc atggtgattt ctcacttgat aaccttattt ttgacgaggg    4620
gaaattaata ggttgtattg atgttggacg agtcggaatc gcagaccgat accaggatct    4680
```

```
tgccatccta tggaactgcc tcggtgagtt ttctccttca ttacagaaac ggcttttttca    4740 aaaatatggt attgataatc ctgatatgaa taaattgcag tttcatttga tgctcgatga    4800 gttttttctaa gaattaattc atgagcggat acatatttga atgtatttag aaaaataaac    4860 aaatagggt tccgcgcaca tttccccgaa aagtgccacc tgaaattgta acgttaata      4920 ttttgttaaa attcgcgtta aattttttgtt aaatcagctc atttttttaac caataggccg   4980 aaatcggcaa aatcccttat aaatcaaaag aatagaccga gatagggttg agtgttgttc   5040
cagtttggaa caagagtcca ctattaaaga acgtggactc caacgtcaaa gggcgaaaaa   5100
ccgtctatca gggcgatggc ccactacgtg aaccatcacc ctaatcaagt ttttttgggt    5160
cgaggtgccg taaagcacta atcggaacc ctaaagggag ccccgattt agagcttgac     5220 ggggaaagcc ggcgaacgtg gcgagaaagg aagggaagaa agcgaaagga gcgggcgcta   5280
gggcgctggc aagtgtagcg gtcacgctgc gcgtaaccac cacacccgcc gcgcttaatg   5340
cgccgctaca gggcgcgtcc cattcgcca                                     5369
```

<210> SEQ ID NO 4
<211> LENGTH: 7244
<212> TYPE: DNA
<213> ORGANISM: Artificial Sequence
<220> FEATURE:
<223> OTHER INFORMATION: pET-28-ChCODH-2

<400> SEQUENCE: 4

```
atccggatat agttcctcct ttcagcaaaa aaccccctcaa gacccgttta gaggccccaa     60
ggggttatgc tagttattgc tcagcggtgg cagcagccaa ctcagcttcc tttcgggctt    120
tgttagcagc cggatctcag tggtggtggt ggtggtgctc gagtgcggcc gcaagcttgt   180
cgacggagct cgaattcgga tcctcaccac ggcagaccca gacccgcacg acgctcattg   240
atcgccgcca gcagtttgtc cgccgcggtc tccgggtcca gttcaacgat gaagtagcca   300
ccggtaatat ctttaacgct gctggtcagg atttgggtca ccgcaggct gccggtgatc    360 ggcggcagca caccaatgtg ggtcggcaga ccgatggtaa ccgcccaggt accaatcgcc   420
accgccttct catgcatcgc ttccgccgcg ctcgcaacca ccggcagacg atccaggtca   480
acgcccagac ggttcgccag cgccgcaacc agcgccaccg cacggctgtt gtcaacgcag   540
ctacccatgt gcagcaccgg cggcagcggg ccacccagac cgttcgcttc accgatcgcg   600
gtcagaaccg ctttcagacc gtcgccgcac agctcatcca cgttcgccgg gtccataaaa   660
ccgtgacgca tcagcgcacc cgcaccgcaa ccggtcgcaa ccaccagaac gttctgtttc   720
agcagcttac gcgcaatggt ggtaaagttt tggtcctgcg gcaccttaac gttgttgcaa   780
cccgcgaaca ggcacacgcc acggatgtta ccgttaacca cgttgtcaat cagcggtttc   840
agcggatcgt tcgcgttcag cttgctcagc gcgttaatga tcgcttcggt gctgaagccc   900
gcaaccactt tggtcttaat gttcgggatc tccaccggtt tacccttacg acgttttaaag   960 gtatcaatcg ccagacgcag gatttgcttc gcgttctcaa ccgccgcttc ctccgcaaag  1020
ttcacatggg tcgcaccggt gattttgctc atttccatgg tggtaataac ggtggtaccg  1080
gtgcactccg caatggtcgc cacgctcggt tgaatgcact gataatccag gatcatcgcg  1140
tccagcgcgc cggtgatcat cgccatttcc tggctaacgc tgtgggtgca cgccggaata  1200
ccgtgacgca tcagcacctc gttgccggtg cagcaaatac caaccacgtt gataccggtc  1260
gcacccgccg cacgcgcctc gttttccatc tctttgctca cgctaacaat gatgtcgctc  1320
```

```
agaaccgggt tgtgaccgtg caccgcaacg ttcaccgcat ccgccttcag cacgcccagg    1380
ttgctttcgg taaccaccgg cgccggggta ccaaacagga tatccgccag gtcggtgccc    1440
atgtagcaac ccgccaggtc cgccaggctg caacgcaggc cacccagcag caggttctgc    1500
gcatccgcgt cgcaacccat gctggtacgg tgcataatct ccgcgatttc gtgatcaata    1560
cccgccggga tcagaccatg cgcgctcaga accttcacac ggctcggcgg cagaacggtg    1620
gtcacccaca gaaccggggt atctttctca tggaagtccg ccagcgccgc tttcgcaact    1680
tccagcgcaa tatcctcgtc ttttttggcct tcggtcggaa tacccagacg cttcgcgatg    1740
ctgtgcagtt tggtacggtc cttaatcata tagctcgccg cttttgccctg caccgctttc    1800 ttcagggtgt gcgccaggtg cttcgcatga ccgctatgac ccgccgcacc cgccgcaatg    1860
ctacggtcca ccacgcgc aacgatcact tccgcggtcg caccgcaaat gcccactttc    1920
ggctcatcgc caaacgggtt aatacggcac ggaccttgca ggcagtgacg gcagcacaga    1980
ccggtttcgc cgaaaccgca ctgcggcttc atcgcctcgt aacgatccca cacggtttga    2040
ataccctcac gcttcgcttt atccagcatt tgttgaaccg cacggtcggt gctcttcaga    2100
ttttgtttcg ccatatggct gccgcgcggc accaggccgc tgctgtgatg atgatgatga    2160
tggctgctgc ccatggtata tctccttctt aaagttaaac aaaattattt ctagagggga    2220
attgttatcc gctcacaatt cccctatagt gagtcgtatt aatttcgcgg gatcgagatc    2280
tcgatcctct acgccggacg catcgtggcc ggcatcaccg cgccacagg tgcggttgct    2340 ggcgcctata tcgccgacat caccgatggg gaagatcggg ctcgccactt cgggctcatg    2400
agcgcttgtt tcggcgtggg tatggtggca ggccccgtgg ccgggggact gttgggcgcc    2460
atctccttgc atgcaccatt ccttgcggcg gcggtgctca acggcctcaa cctactactg    2520
ggctgcttcc taatgcagga gtcgcataag ggagagcgtc gagatcccgg acaccatcga    2580
atggcgcaaa acctttcgcg gtatggcatg atagcgcccg gaagagagtc aattcagggt    2640
ggtgaatgtg aaaccagtaa cgttatacga tgtcgcagag tatgccggtg tctcttatca    2700
gaccgttttc cgcgtggtga accaggccag ccacgtttct gcgaaaacgc gggaaaaagt    2760
ggaagcggcg atggcggagc tgaattacat tcccaaccgc gtggcacaac aactggcggg    2820
caaacagtcg ttgctgattg gcgttgccac ctccagtctg gccctgcacg cgccgtcgca    2880
aattgtcgcg gcgattaaat ctcgcgccga tcaactgggt gccagcgtgg tggtgtcgat    2940
ggtagaacga agcggcgtcg aagcctgtaa agcggcggtg cacaatcttc tcgcgcaacg    3000
cgtcagtggg ctgatcatta actatccgct ggatgaccag gatgccattg ctgtggaagc    3060
tgcctgcact aatgttccgg cgttatttct tgatgtctct gaccagacac ccatcaacag    3120
tattattttc tcccatgaag acggtacgcg actgggcgtg gagcatctgg tcgcattggg    3180
tcaccagcaa atcgcgctgt tagcgggccc attaagttct gtctcggcgc gtctgcgtct    3240
ggctggctgg cataaatatc tcactcgcaa tcaaattcag ccgatagcgg aacgggaagg    3300
cgactggagt gccatgtccg ttttcaaca aaccatgcaa atgctgaatg agggcatcgt    3360
tcccactgcg atgctggttg ccaacgatca gatggcgctg ggcgcaatgc gcgccattac    3420
cgagtccggg ctgcgcgttg gtgcggatat ctcggtagtg ggatacgacg ataccgaaga    3480
cagctcatgt tatatcccgc cgttaaccac catcaaacag gattttcgcc tgctggggca    3540
aaccagcgtg gaccgcttgc tgcaactctc tcagggccag gcggtgaagg gcaatcagct    3600
gttgcccgtc tcactggtga aaagaaaaac caccctggcg cccaatacgc aaaccgcctc    3660
tccccgcgcg ttggccgatt cattaatgca gctggcacga caggtttccc gactggaaag    3720
```

```
cgggcagtga gcgcaacgca attaatgtaa gttagctcac tcattaggca ccgggatctc    3780
gaccgatgcc cttgagagcc ttcaacccag tcagctcctt ccggtgggcg cggggcatga    3840
ctatcgtcgc cgcacttatg actgtcttct ttatcatgca actcgtagga caggtgccgg    3900
cagcgctctg ggtcattttc ggcgaggacc gctttcgctg gagcgcgacg atgatcggcc    3960
tgtcgcttgc ggtattcgga atcttgcacg ccctcgctca agccttcgtc actggtcccg    4020
ccaccaaacg tttcggcgag aagcaggcca ttatcgccgg catggcggcc cacgggtgc    4080 gcatgatcgt gctcctgtcg ttgaggaccc ggctaggctg gcggggttgc cttactggtt    4140
agcagaatga atcaccgata cgcgagcgaa cgtgaagcga ctgctgctgc aaaacgtctg    4200
cgacctgagc aacaacatga atggtcttcg gtttccgtgt ttcgtaaagt ctggaaacgc    4260
ggaagtcagc gccctgcacc attatgttcc ggatctgcat cgcaggatgc tgctggctac    4320
cctgtggaac acctacatct gtattaacga agcgctggca ttgaccctga gtgattttc    4380 tctggtcccg ccgcatccat accgccagtt gtttaccctc acaacgttcc agtaaccggg    4440
catgttcatc atcagtaacc cgtatcgtga gcatcctctc tcgtttcatc ggtatcatta    4500
cccccatgaa cagaaatccc ccttacacgg aggcatcagt gaccaaacag gaaaaaaccg    4560
cccttaacat ggcccgcttt atcagaagcc agacattaac gcttctggag aaactcaacg    4620
agctggacgc ggatgaacag gcagacatct gtgaatcgct tcacgaccac gctgatgagc    4680
tttaccgcag ctgcctcgcg cgtttcggtg atgacggtga aaacctctga cacatgcagc    4740
tcccggagac ggtcacagct tgtctgtaag cggatgccgg gagcagacaa gcccgtcagg    4800
gcgcgtcagc gggtgttggc gggtgtcggg gcgcagccat gacccagtca cgtagcgata    4860
gcggagtgta tactggctta actatgcggc atcagagcag attgtactga gagtgcacca    4920
tatatgcggt gtgaaatacc gcacagatgc gtaaggagaa ataccgcat caggcgctct    4980 tccgcttcct cgctcactga ctcgctgcgc tcggtcgttc ggctgcggcg agcggtatca    5040
gctcactcaa aggcggtaat acggttatcc acagaatcag gggataacgc aggaaagaac    5100
atgtgagcaa aaggccagca aaaggccagg aaccgtaaaa aggccgcgtt gctggcgttt    5160
ttccataggc tccgcccccc tgacgagcat cacaaaaatc gacgctcaag tcagaggtgg    5220
cgaaacccga caggactata aagataccag gcgtttcccc ctggaagctc cctcgtgcgc    5280
tctcctgttc cgaccctgcc gcttaccgga tacctgtccg cctttctccc ttcgggaagc    5340
gtggcgcttt ctcatagctc acgctgtagg tatctcagtt cggtgtaggt cgttcgctcc    5400
aagctgggct gtgtgcacga accccccgtt cagcccgacc gctgcgcctt atccggtaac    5460
tatcgtcttg agtccaaccc ggtaagacac gacttatcgc cactggcagc agccactggt    5520
aacaggatta gcagagcgag gtatgtaggc ggtgctacag agttcttgaa gtggtggcct    5580
aactacggct acactagaag gacagtattt ggtatctgcg ctctgctgaa gccagttacc    5640
ttcggaaaaa gagttggtag ctcttgatcc ggcaaacaaa ccaccgctgg tagcggtggt    5700
ttttttgttt gcaagcagca gattacgcgc agaaaaaaag gatctcaaga agatcctttg    5760
atcttttcta cggggtctga cgctcagtgg aacgaaaact cacgttaagg gattttggtc    5820
atgaacaata aaactgtctg cttacataaa cagtaataca agggggtgtta tgagccatat    5880 tcaacgggaa acgtcttgct ctaggccgcg attaaattcc aacatggatg ctgatttata    5940
tgggtataaa tgggctcgcg ataatgtcgg gcaatcaggt gcgacaatct atcgattgta    6000
tgggaagccc gatgcgccag agttgtttct gaaacatggc aaaggtagcg ttgccaatga    6060
```

```
tgttacagat gagatggtca gactaaactg gctgacggaa tttatgcctc ttccgaccat    6120
caagcatttt atccgtactc ctgatgatgc atggttactc accactgcga tccccgggaa    6180
aacagcattc caggtattag aagaatatcc tgattcaggt gaaaatattg ttgatgcgct    6240
ggcagtgttc ctgcgccggt tgcattcgat tcctgtttgt aattgtcctt ttaacagcga    6300
tcgcgtattt cgtctcgctc aggcgcaatc acgaatgaat aacggtttgg ttgatgcgag    6360
tgattttgat gacgagcgta atggctggcc tgttgaacaa gtctggaaag aaatgcataa    6420
acttttgcca ttctcaccgg attcagtcgt cactcatggt gatttctcac ttgataacct    6480 tattttttgac gagggggaaat taataggttg tattgatgtt ggacgagtcg gaatcgcaga    6540
ccgataccag gatcttgcca tcctatggaa ctgcctcggt gagttttctc cttcattaca    6600
gaaacggctt tttcaaaaat atggtattga taatcctgat atgaataaat tgcagtttca    6660
tttgatgctc gatgagtttt tctaagaatt aattcatgag cggatacata tttgaatgta    6720
tttagaaaaa taaacaaata ggggttccgc gcacatttcc ccgaaaagtg ccacctgaaa    6780
ttgtaaacgt taatattttg ttaaaattcg cgttaaattt tgttaaatc agctcatttt    6840 ttaaccaata ggccgaaatc ggcaaaatcc cttataaatc aaaagaatag accgagatag    6900
ggttgagtgt tgttccagtt tggaacaaga gtccactatt aaagaacgtg gactccaacg    6960
tcaaagggcg aaaaaccgtc tatcagggcg atggcccact acgtgaacca tcacctaat    7020 caagtttttt ggggtcgagg tgccgtaaag cactaaatcg aaccctaaa gggagccccc    7080 gatttagagc ttgacgggga agccggcga acgtggcgag aaaggaaggg aagaaagcga    7140
aaggagcggg cgctagggcg ctggcaagtg tagcggtcac gctgcgcgta accaccacac    7200
ccgccgcgct taatgcgccg ctacagggcg cgtcccattc gcca    7244

<210> SEQ ID NO 5
<211> LENGTH: 7195
<212> TYPE: DNA
<213> ORGANISM: Artificial Sequence
<220> FEATURE:
<223> OTHER INFORMATION: pET-28-ChCODH-4

<400> SEQUENCE: 5
atccggatat agttcctcct ttcagcaaaa aaccccctcaa gacccgttta gaggccccaa      60
ggggttatgc tagttattgc tcagcggtgg cagcagccaa ctcagcttcc tttcgggctt     120
tgttagcagc cggatctcag tggtggtggt ggtggtgctc gagttataaa ttcagtagag     180 cccgttagc cttaatatgt tcaatgatgc ccgctgctgc tttatatggg tccgtttcca     240
cataaaattt gccgcctatt aaagcctcgg catcttgggt aagaatacgg gtaacttttg     300
aacttccgac cacaggtgga caactccca agtgggtcat aatacccatc gctaccgccc     360
aggttccgat gctcaaagcc ttttcatgct ggtattcagg tgcagaagcc gcaatcggaa     420
ggtcttttgg acttactta aggtagtttg cgacggcgat cactaagtcc ccgattcggg     480
agttatcaac acacgatccc atgtgcaaaa caggcggcag cgggccgccc aaatcattag     540
ccgtgcctat tgccgttaag acggctcgta aaccctcgcc agcccattcg gctgctgcgg     600
ggtccatcaa gcctgctttc gctaacgcat gagcggaaca gcctgtagtc accactaaca     660
cattgttttt aattagttct tttactaatt ctatgtggaa ccaatcatgc ttgaccttca     720
cattgttaca accaacggtg gcgaccacac ccagaatgtt gccagacaca atattatcaa     780
ttaagggctt taacgatcg tcaggattta gtttcgctaa cgcttttact attgcctcaa     840
cgctgaatcc tgctacaact ttggcttttt ccctggggat gtagaccttg gctggattgc     900
```

```
gtttttggta actctctata gccatacgca caatctgctg cgaggcctca tcggcagttt    960
ctgtggtgaa cggaacatgc tccgcacctg gaattttcac aatcggcatg gtagtgacta   1020
agcgggtatg atagcaagca gcaatttctg ctaatgaggg cataatacac tgaacatcca   1080
ctaccattaa gtcaactgcc cccgtaataa tcgccaactc ctgggccagg aagtttgttg   1140
ctaacggtac accctgacgc attaacacct cgttaccagt acaacatata cctgcaagat   1200
tgattccttt tgcccctgct tttttcgcct catcttccaa ctttctgctc cattcaacaa   1260
ttttttcgct aagtaacgga acatggccgt ggactatgat attcacataa tcttctttga   1320
gtacacccag atttgcttct gtgacaactg gctggggagt gccaaaaatg atgtcctgta   1380
aatccgtcgc taacttgaga cccgcaaaac catcaaccag accaaggcga atagttttta   1440
agattaaatt tactgggtcc gcatccatcc ccattgtagt ctggtgtaag gcttctctga   1500
tttcacggtc tgggttacga ggcagaaccc ctaattttc ccatgtctca aggcgttccc   1560
gaggagagtt ggctttcaga taggtcatcg gtgttgcacc agaattggca aaatcccgat   1620
agataatttg gcacatctct tcaacaatct cctgctctgt tttgttagcg gtatctatac   1680
ctaaggtaaa agcgacctgc tttaactttt cttgatcttt gatactgtat gattccgtac   1740
cttgggcgat ttgttccaaa acttccagca catcatacgc atggtctaca tgggcggcag   1800
cacccgccgt gacttgacgc agcagattgc gagccgttat tacctcggcg gtagcaccgc   1860
aaatgcccgc ttgcggtcct tccccaaacg gatctatgcg gcacggtccc tgcacgcaat   1920
gacgacagca aaggcctgta agcccaaatc cgcactgagg ctgctgtgct tcataacgat   1980
caaaaacagt ggaaatccct tcctctctgg ctttacgata taaattcggg atcacaggat   2040
ctactgataa cttgctttta tccatatggc tgccgcgcgg caccaggccg ctgctgtgat   2100
gatgatgatg atggctgctg cccatggtat atctccttct taaagttaaa caaaattatt   2160
tctagagggg aattgttatc cgctcacaat tcccctatag tgagtcgtat taatttcgcg   2220
ggatcgagat ctcgatcctc tacgccggac gcatcgtggc cggcatcacc ggcgccacag   2280
gtgcggttgc tggcgcctat atcgccgaca tcaccgatgg ggaagatcgg gctcgccact   2340
tcgggctcat gagcgcttgt ttcggcgtgg gtatggtggc aggccccgtg gccggggac    2400 tgttgggcgc catctccttg catgcaccat tccttgcggc ggcggtgctc aacggcctca   2460
acctactact gggctgcttc ctaatgcagg agtcgcataa gggagagcgt cgagatcccg   2520
gacaccatcg aatggcgcaa acctttcgc ggtatggcat gatagcgccc ggaagagagt    2580
caattcaggg tggtgaatgt gaaaccagta acgttatacg atgtcgcaga gtatgccggt   2640
gtctcttatc agaccgtttc ccgcgtggtg aaccaggcca ccacgtttc tgcgaaaacg    2700 cggaaaaag tggaagcggc gatggcggag ctgaattaca ttcccaaccg cgtggcacaa    2760
caactggcgg gcaaacagtc gttgctgatt ggcgttgcca cctccagtct ggccctgcac   2820
gcgccgtcgc aaattgtcgc ggcgattaaa tctcgcgccg atcaactggg tgccagcgtg   2880
gtggtgtcga tggtagaacg aagcggcgtc gaagcctgta aagcggcggt gcacaatctt   2940
ctcgcgcaac gcgtcagtgg gctgatcatt aactatccgc tggatgacca ggatgccatt   3000
gctgtggaag ctgcctgcac taatgttccg gcgttatttc ttgatgtctc tgaccagaca   3060
cccatcaaca gtattatttt ctcccatgaa gacggtacgc gactgggcgt ggagcatctg   3120
gtcgcattgg gtcaccagca aatcgcgctg ttagcgggcc cattaagttc tgtctcggcg   3180
cgtctgcgtc tggctggctg gcataaatat ctcactcgca atcaaattca gccgatagcg   3240
```

```
gaacgggaag gcgactggag tgccatgtcc ggttttcaac aaaccatgca aatgctgaat    3300
gagggcatcg ttcccactgc gatgctggtt gccaacgatc agatggcgct gggcgcaatg    3360
cgcgccatta ccgagtccgg gctgcgcgtt ggtgcggata tctcggtagt gggatacgac    3420
gataccgaag acagctcatg ttatatcccg ccgttaacca ccatcaaaca ggattttcgc    3480
ctgctggggc aaaccagcgt ggaccgcttg ctgcaactct ctcagggcca ggcggtgaag    3540
ggcaatcagc tgttgcccgt ctcactggtg aaaagaaaaa ccaccctggc gcccaatacg    3600
caaaccgcct ctccccgcgc gttggccgat tcattaatgc agctggcacg acaggtttcc    3660
cgactggaaa gcgggcagtg agcgcaacgc aattaatgta agttagctca ctcattaggc    3720
accgggatct cgaccgatgc ccttgagagc cttcaaccca gtcagctcct tccggtgggc    3780
gcggggcatg actatcgtcg ccgcacttat gactgtcttc tttatcatgc aactcgtagg    3840
acaggtgccg gcagcgctct gggtcatttt cggcgaggac cgctttcgct ggagcgcgac    3900
gatgatcggc ctgtcgcttg cggtattcgg aatcttgcac gccctcgctc aagccttcgt    3960
cactggtccc gccaccaaac gtttcggcga aagcaggcc attatcgccg gcatggcggc     4020
cccacgggtg cgcatgatcg tgctcctgtc gttgaggacc cggctaggct ggcggggttg    4080
ccttactggt tagcagaatg aatcaccgat acgcgagcga acgtgaagcg actgctgctg    4140
caaaacgtct gcgacctgag caacaacatg aatggtcttc ggtttccgtg tttcgtaaag    4200
tctggaaacg cggaagtcag cgccctgcac cattatgttc cggatctgca tcgcaggatg    4260
ctgctggcta ccctgtggaa cacctacatc tgtattaacg aagcgctggc attgaccctg    4320
agtgattttt tctctggtccc gccgcatcca taccgccagt tgtttaccct cacaacgttc    4380
cagtaaccgg gcatgttcat catcagtaac ccgtatcgtg agcatcctct ctcgtttcat    4440
cggtatcatt acccccatga acagaaatcc cccttacacg gaggcatcag tgaccaaaca    4500
ggaaaaaacc gcccttaaca tggcccgctt tatcagaagc cagacattaa cgcttctgga    4560
gaaactcaac gagctggacg cggatgaaca ggcagacatc tgtgaatcgc ttcacgacca    4620
cgctgatgag ctttaccgca gctgcctcgc gcgtttcggt gatgacggtg aaaacctctg    4680
acacatgcag ctcccggaga cggtcacagc ttgtctgtaa gcggatgccg ggagcagaca    4740
agcccgtcag ggcgcgtcag cgggtgttgg cgggtgtcgg ggcgcagcca tgacccagtc    4800
acgtagcgat agcggagtgt atactggctt aactatgcgg catcagagca gattgtactg    4860
agagtgcacc atatatgcgg tgtgaaatac cgcacagatg cgtaaggaga aaataccgca    4920
tcaggcgctc ttccgcttcc tcgctcactg actcgctgcg ctcggtcgtt cggctgcggc    4980
gagcggtatc agctcactca aaggcggtaa tacggttatc cacagaatca ggggataacg    5040
caggaaagaa catgtgagca aaaggccagc aaaaggccag gaaccgtaaa aaggccgcgt    5100
tgctggcgtt tttccatagg ctccgccccc ctgacgagca tcacaaaaat cgacgctcaa    5160
gtcagaggtg gcgaaacccg acaggactat aaagatacca ggcgtttccc cctggaagct    5220
ccctcgtgcg ctctcctgtt ccgaccctgc cgcttaccgg atacctgtcc gcctttctcc    5280
cttcgggaag cgtggcgctt tctcatagct cacgctgtag gtatctcagt tcggtgtagg    5340
tcgttcgctc caagctgggc tgtgtgcacg aaccccccgt tcagcccgac cgctgcgcct    5400
tatccggtaa ctatcgtctt gagtccaacc cggtaagaca cgacttatcg ccactggcag    5460
cagccactgg taacaggatt agcagagcga ggtatgtagg cggtgctaca gagttcttga    5520
agtggtggcc taactacggc tacactagaa ggacagtatt tggtatctgc gctctgctga    5580
agccagttac cttcggaaaa agagttggta gctcttgatc cggcaaacaa accaccgctg    5640
```

```
gtagcggtgg ttttttttgtt tgcaagcagc agattacgcg cagaaaaaaa ggatctcaag    5700
aagatccttt gatcttttct acggggtctg acgctcagtg gaacgaaaac tcacgttaag    5760
ggattttggt catgaacaat aaaactgtct gcttacataa acagtaatac aagggggtgtt   5820 atgagccata ttcaacggga aacgtcttgc tctaggccgc gattaaattc caacatggat    5880
gctgatttat atgggtataa atgggctcgc gataatgtcg ggcaatcagg tgcgacaatc    5940
tatcgattgt atgggaagcc cgatgcgcca gagttgtttc tgaaacatgg caaaggtagc    6000
gttgccaatg atgttacaga tgagatggtc agactaaact ggctgacgga atttatgcct    6060
cttccgacca tcaagcattt tatccgtact cctgatgatg catggttact caccactgcg    6120
atccccggga aaacagcatt ccaggtatta gaagaatatc ctgattcagg tgaaaatatt    6180
gttgatgcgc tggcagtgtt cctgcgccgg ttgcattcga ttcctgtttg taattgtcct    6240
tttaacagcg atcgcgtatt tcgtctcgct caggcgcaat cacgaatgaa taacggtttg    6300
gttgatgcga gtgattttga tgacgagcgt aatggctggc ctgttgaaca agtctggaaa    6360
gaaatgcata aacttttgcc attctcaccg gattcagtcg tcactcatgg tgatttctca    6420
cttgataacc ttatttttga cgaggggaaa ttaataggtt gtattgatgt tggacgagtc    6480
ggaatcgcag accgatacca ggatcttgcc atcctatgga actgcctcgg tgagttttct    6540
ccttcattac agaaacggct ttttcaaaaa tatggtattg ataatcctga tatgaataaa    6600
ttgcagtttc atttgatgct cgatgagttt ttctaagaat taattcatga gcggatacat    6660
atttgaatgt atttagaaaa ataaacaaat aggggttccg cgcacatttc cccgaaaagt    6720
gccacctgaa attgtaaacg ttaatatttt gttaaaattc gcgttaaatt tttgttaaat    6780
cagctcattt tttaaccaat aggccgaaat cggcaaaatc ccttataaat caaaagaata    6840
gaccgagata gggttgagtg ttgttccagt ttggaacaag agtccactat taagaacgt     6900 ggactccaac gtcaaagggc gaaaaaccgt ctatcagggc gatggcccac tacgtgaacc    6960
atcaccctaa tcaagttttt tggggtcgag gtgccgtaaa gcactaaatc ggaaccctaa    7020
agggagcccc cgatttagag cttgacgggg aaagccggcg aacgtggcga aaaggaagg    7080 gaagaaagcg aaaggagcgg cgctagggc gctggcaagt gtagcggtca cgctgcgcgt     7140
aaccaccaca cccgccgcgc ttaatgcgcc gctacagggc gcgtcccatt cgcca          7195
```

<210> SEQ ID NO 6
<211> LENGTH: 33
<212> TYPE: DNA
<213> ORGANISM: Artificial Sequence
<220> FEATURE:
<223> OTHER INFORMATION: A559W-F

<400> SEQUENCE: 6
gcgcggcgga atggatgcat gagaaggcgg tgg                                 33

<210> SEQ ID NO 7
<211> LENGTH: 32
<212> TYPE: DNA
<213> ORGANISM: Artificial Sequence
<220> FEATURE:
<223> OTHER INFORMATION: A559W-R

<400> SEQUENCE: 7
tctcatgcat ccattccgcc gcgctcgcaa cc                                  32

<210> SEQ ID NO 8
<211> LENGTH: 33
<212> TYPE: DNA
<213> ORGANISM: Artificial Sequence
<220> FEATURE:
<223> OTHER INFORMATION: A559Y-F

<400> SEQUENCE: 8
gcgcggcgga atacatgcat gagaaggcgg tgg              33

<210> SEQ ID NO 9
<211> LENGTH: 32
<212> TYPE: DNA
<213> ORGANISM: Artificial Sequence
<220> FEATURE:
<223> OTHER INFORMATION: A559Y-R

<400> SEQUENCE: 9
tctcatgcat gtattccgcc gcgctcgcaa cc               32

<210> SEQ ID NO 10
<211> LENGTH: 32
<212> TYPE: DNA
<213> ORGANISM: Artificial Sequence
<220> FEATURE:
<223> OTHER INFORMATION: A559S-F

<400> SEQUENCE: 10
cgcggcggaa agcatgcatg agaaggcggt gg               32

<210> SEQ ID NO 11
<211> LENGTH: 32
<212> TYPE: DNA
<213> ORGANISM: Artificial Sequence
<220> FEATURE:
<223> OTHER INFORMATION: A559S-R

<400> SEQUENCE: 11
tctcatgcat gctttccgcc gcgctcgcaa cc               32

<210> SEQ ID NO 12
<211> LENGTH: 32
<212> TYPE: DNA
<213> ORGANISM: Artificial Sequence
<220> FEATURE:
<223> OTHER INFORMATION: A559H-F

<400> SEQUENCE: 12
cgcggcggaa cacatgcatg agaaggcggt gg               32

<210> SEQ ID NO 13
<211> LENGTH: 32
<212> TYPE: DNA
<213> ORGANISM: Artificial Sequence
<220> FEATURE:
<223> OTHER INFORMATION: A559H-R

<400> SEQUENCE: 13
tctcatgcat gtgttccgcc gcgctcgcaa cc               32

<210> SEQ ID NO 14
<211> LENGTH: 32
<212> TYPE: DNA
<213> ORGANISM: Artificial Sequence
<220> FEATURE:

<223> OTHER INFORMATION: A559D-F

<400> SEQUENCE: 14
cgcggcggaa gatatgcatg agaaggcggt gg                32

<210> SEQ ID NO 15
<211> LENGTH: 32
<212> TYPE: DNA
<213> ORGANISM: Artificial Sequence
<220> FEATURE:
<223> OTHER INFORMATION: A559D-R

<400> SEQUENCE: 15
tctcatgcat atcttccgcc gcgctcgcaa cc                32

<210> SEQ ID NO 16
<211> LENGTH: 29
<212> TYPE: DNA
<213> ORGANISM: Artificial Sequence
<220> FEATURE:
<223> OTHER INFORMATION: A559E-F

<400> SEQUENCE: 16
cgcggcggaa gagatgcatg agaaggcgg                   29

<210> SEQ ID NO 17
<211> LENGTH: 30
<212> TYPE: DNA
<213> ORGANISM: Artificial Sequence
<220> FEATURE:
<223> OTHER INFORMATION: A559E-R

<400> SEQUENCE: 17
tctcatgcat ctcttccgcc gcgctcgcaa                  30

<210> SEQ ID NO 18
<211> LENGTH: 33
<212> TYPE: DNA
<213> ORGANISM: Artificial Sequence
<220> FEATURE:
<223> OTHER INFORMATION: A559N-F

<400> SEQUENCE: 18
gcgcggcgga aaacatgcat gagaaggcgg tgg              33

<210> SEQ ID NO 19
<211> LENGTH: 32
<212> TYPE: DNA
<213> ORGANISM: Artificial Sequence
<220> FEATURE:
<223> OTHER INFORMATION: A559N-R

<400> SEQUENCE: 19
tctcatgcat gttttccgcc gcgctcgcaa cc                32

<210> SEQ ID NO 20
<211> LENGTH: 32
<212> TYPE: DNA
<213> ORGANISM: Artificial Sequence
<220> FEATURE:
<223> OTHER INFORMATION: V610A-F

<400> SEQUENCE: 20
gctacttcat cgcggaactg gacccggaga cc                32

<210> SEQ ID NO 21
<211> LENGTH: 30
<212> TYPE: DNA
<213> ORGANISM: Artificial Sequence
<220> FEATURE:
<223> OTHER INFORMATION: V610A-R

<400> SEQUENCE: 21

```
ggtccagttc cgcgatgaag tagccaccgg                                30
```

<210> SEQ ID NO 22
<211> LENGTH: 32
<212> TYPE: DNA
<213> ORGANISM: Artificial Sequence
<220> FEATURE:
<223> OTHER INFORMATION: V610S-F

<400> SEQUENCE: 22

```
gctacttcat cagcgaactg gacccggaga cc                             32
```

<210> SEQ ID NO 23
<211> LENGTH: 30
<212> TYPE: DNA
<213> ORGANISM: Artificial Sequence
<220> FEATURE:
<223> OTHER INFORMATION: V610S-R

<400> SEQUENCE: 23

```
ggtccagttc gctgatgaag tagccaccgg                                30
```

<210> SEQ ID NO 24
<211> LENGTH: 1911
<212> TYPE: DNA
<213> ORGANISM: Artificial Sequence
<220> FEATURE:
<223> OTHER INFORMATION: ChCODH-2 A559W

<400> SEQUENCE: 24

```
atggcgaaac aaaatctgaa gagcaccgac cgtgcggttc aacaaatgct ggataaagcg    60
aagcgtgagg gtattcaaac cgtgtgggat cgttacgagg cgatgaagcc gcagtgcggt   120
ttcggcgaaa ccggtctgtg ctgccgtcac tgcctgcaag gtccgtgccg tattaacccg   180
tttggcgatg agccgaaagt gggcatttgc ggtgcgaccg cggaagtgat cgttgcgcgt   240
ggtctggacc gtagcattgc ggcggtgcg gcgggtcata gcggtcatgc gaagcacctg   300
gcgcacaccc tgaagaaagc ggtgcagggc aaagcggcga gctatatgat taaggaccgt   360
accaaactgc acagcatcgc gaagcgtctg ggtattccga ccgaaggcca aaagacgag   420
gatattgcgc tggaagttgc gaaagcggcg ctggcggact ccatgagaaa agataccccg   480
gttctgtggg tgaccaccgt tctgccgccg agccgtgtga aggttctgag cgcgcatggt   540
ctgatcccgg cgggtattga tcacgaaatc gcggagatta tgcaccgtac cagcatgggt   600
tgcgacgcgc atgcgcagaa cctgctgctg gtggcctgc gttgcagcct ggcggacctg   660
gcgggttgct acatgggcac cgacctggcg gatatcctgt ttggtacccc ggcgccggtg   720
gttaccgaaa gcaacctggg cgtgctgaag gcggatgcgg tgaacgttgc ggtgcacggt   780
cacaacccgg ttctgagcga catcattgtt agcgtgagca aagagatgga aaacgaggcg   840
cgtgcggcgg gtgcgaccgg tatcaacgtg gttggtatt gctgcaccgg caacgaggtg   900
ctgatgcgtc acggtattcc ggcgtgcacc cacagcgtta gccaggaaat ggcgatgatc   960
accggcgcgc tggacgcgat gatcctggat tatcagtgca ttcaaccgag cgtggcgacc  1020
```

```
attgcggagt gcaccggtac caccgttatt accaccatgg aaatgagcaa atcaccggt     1080
gcgacccatg tgaactttgc ggaggaagcg gcggttgaga acgcgaagca aatcctgcgt    1140
ctggcgattg ataccttaa acgtcgtaag ggtaaaccgg tggagatccc gaacattaag     1200
accaaagtgg ttgcgggctt cagcaccgaa gcgatcatta acgcgctgag caagctgaac    1260
gcgaacgatc cgctgaaacc gctgattgac aacgtggtta cggtaacat ccgtggcgtg    1320
tgcctgttcg cggggtgcaa caacgttaag gtgccgcagg accaaaactt taccaccatt   1380
gcgcgtaagc tgctgaaaca aacgttctg gtggttgcga ccggttgcgg tgcgggtgcg    1440
ctgatgcgtc acggttttat ggacccggcg aacgtggatg agctgtgcgg cgacggtctg   1500
aaagcggttc tgaccgcgat cggtgaagcg aacggtctgg tggcccgct gccgccggtg    1560
ctgcacatgg gtagctgcgt tgacaacagc cgtgcggtgg cgctggttgc ggcgctggcg   1620
aaccgtctgg gcgttgaccct ggatcgtctg ccggtggttg cgagcgcggc ggaatggatg  1680
catgagaagg cggtggcgat tggtacctgg gcggttacca tcggtctgcc gacccacatt   1740
ggtgtgctgc cgccgatcac cggcagcctg ccggtgaccc aaatcctgac cagcagcgtt   1800
aaagatatta ccggtggcta cttcatcgtt gaactggacc cggagaccgc ggcggacaaa   1860
ctgctggcgc cgatcaatga gcgtcgtgcg ggtctgggtc tgccgtggtg a            1911
```

<210> SEQ ID NO 25
<211> LENGTH: 1911
<212> TYPE: DNA
<213> ORGANISM: Artificial Sequence
<220> FEATURE:
<223> OTHER INFORMATION: ChCODH-2 A559Y
<400> SEQUENCE: 25

```
atggcgaaac aaaatctgaa gagcaccgac cgtgcggttc aacaaatgct ggataaagcg     60
aagcgtgagg gtattcaaac cgtgtgggat cgttacgagg cgatgaagcc gcagtgcggt    120
ttcggcgaaa ccggtctgtg ctgccgtcac tgcctgcaag gtccgtgccg tattaacccg    180
tttggcgatg agccgaaagt gggcatttgc ggtgcgaccg cggaagtgat cgttgcgcgt   240
ggtctggacc gtagcattgc ggcggggtgcg cgggtcata gcggtcatgc gaagcacctg   300
gcgcacaccc tgaagaaagc ggtgcagggc aaagcggcga gctatatgat taaggaccgt  360
accaaactgc acagcatcgc gaagcgtctg ggtattccga ccgaaggcca aaaagacgag   420
gatattgcgc tggaagttgc gaaagcggcg ctggcggact ccatgagaa agataccccg    480
gttctgtggg tgaccaccgt tctgccgccg agccgtgtga aggttctgag cgcgcatggt   540
ctgatcccgg cgggtattga tcacgaaatc gcggagatta tgcaccgtac cagcatgggt   600
tgcgacgcga tgcgcagaa cctgctgctg ggtggcctgc gttgcagcct ggcggacctg    660
gcgggttgct acatgggcac cgacctggcg gatatcctgt ttggtacccc ggcgccggtg   720
gttaccgaaa gcaacctggg cgtgctgaag gcggatgcgg tgaacgttgc ggtgcacggt   780
cacaacccgg ttctgagcga catcattgtt agcgtgagca aagagatgga aaacgaggcg   840
cgtgcggcgg gtgcgaccgg tatcaacgtg gttggtatt gctgcaccgg caacgaggtg    900
ctgatgcgtc acggtattcc ggcgtgcacc cacagcgtta gcaggaaat ggcgatgatc    960
accggcgcgc tggacgcgat gatcctggat tatcagtgca ttcaaccgag cgtggcgacc   1020
attgcggagt gcaccggtac caccgttatt accaccatgg aaatgagcaa atcaccggt   1080
gcgacccatg tgaactttgc ggaggaagcg gcggttgaga acgcgaagca aatcctgcgt   1140
ctggcgattg ataccttaa acgtcgtaag ggtaaaccgg tggagatccc gaacattaag   1200
```

```
accaaagtgg ttgcgggctt cagcaccgaa gcgatcatta acgcgctgag caagctgaac    1260
gcgaacgatc cgctgaaacc gctgattgac aacgtggtta acgtaacat ccgtggcgtg    1320 tgcctgttcg cggggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggcg aacgtggatg agctgtgcgg cgacggtctg    1500
aaagcggttc tgaccgcgat cggtgaagcg aacggtctgg tggcccgct gccgccggtg    1560 ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaatacatg    1680
catgagaagg cggtggcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911

<210> SEQ ID NO 26
<211> LENGTH: 1911
<212> TYPE: DNA
<213> ORGANISM: Artificial Sequence
<220> FEATURE:
<223> OTHER INFORMATION: ChCODH-2 A559S

<400> SEQUENCE: 26
atggcgaaac aaaatctgaa gagcaccgac cgtgcggttc aacaaatgct ggataaagcg     60
aagcgtgagg gtattcaaac cgtgtgggat cgttacgagg cgatgaagcc gcagtgcggt    120
ttcggcgaaa ccgtctgtg ctgccgtcac tgcctgcaag gtccgtgccg tattaacccg     180
tttggcgatg agccgaaagt gggcattgc ggtgcgaccg cggaagtgat cgttgcgcgt    240
ggtctggacc gtagcattgc ggcgggtgcg cgggtcata gcggtcatgc gaagcacctg    300
gcgcacaccc tgaagaaagc ggtgcagggc aaagcggcga gctatatgat taaggaccgt    360
accaaactgc acagcatcgc gaagcgtctg ggtattccga ccgaaggcca aaaagacgag    420
gatattgcgc tggaagttgc gaaagcggcg ctggcggact ccatgagaa agataccccg    480 gttctgtggg tgaccaccgt tctgccgccg agccgtgtga aggttctgag cgcgcatggt    540
ctgatcccgg cgggtattga tcacgaaatc gcggagatta tgcaccgtac cagcatgggt    600
tgcgacgcgg atgcgcagaa cctgctgctg ggtggcctgc gttgcagcct ggcggacctg    660
gcgggttgct acatgggcac cgacctggcg gatatcctgt ttggtacccc ggcgccggtg    720
gttaccgaaa gcaacctggg cgtgctgaag gcggatgcgg tgaacgttgc ggtgcacggt    780 cacaacccg ttctgagcga catcattgtt agcgtgagca aagagatgga aaacgaggcg    840
cgtgcggcgg gtgcgaccgg tatcaacgtg gttggtattt gctgcaccgg caacgaggtg    900
ctgatgcgtc acggtattcc ggcgtgcacc cacagcgtta gccaggaaat ggcgatgatc    960
accggcgcgc tggacgcgat gatcctggat tatcagtgca ttcaaccgag cgtggcgacc    1020
attgcggagt gcaccggtac caccgttatt accaccatgg aaatgagcaa atcaccggt    1080 gcgacccatg tgaactttgc ggaggaagcg gcggttgaga cgcgaagca aatcctgcgt    1140 ctggcgattg atacctttaa acgtcgtaag ggtaaaccgg tggagatccc gaacattaag    1200
accaaagtgg ttgcgggctt cagcaccgaa gcgatcatta acgcgctgag caagctgaac    1260
gcgaacgatc cgctgaaacc gctgattgac aacgtggtta acgtaacat ccgtggcgtg    1320
```

```
tgcctgttcg cgggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggcg aacgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaaagcatg    1680
catgagaagg cggtggcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911

<210> SEQ ID NO 27
<211> LENGTH: 1911
<212> TYPE: DNA
<213> ORGANISM: Artificial Sequence
<220> FEATURE:
<223> OTHER INFORMATION: ChCODH-2 A559T

<400> SEQUENCE: 27
atggcgaaac aaaatctgaa gagcaccgac cgtgcggttc aacaaatgct ggataaagcg     60
aagcgtgagg gtattcaaac cgtgtgggat cgttacgagg cgatgaagcc gcagtgcggt    120
ttcggcgaaa ccgtctgtg ctgccgtcac tgcctgcaag gtccgtgccg tattaacccg    180
tttggcgatg agccgaaagt gggcatttgc ggtgcgaccg cggaagtgat cgttgcgcgt    240
ggtctggacc gtagcattgc ggcgggtgcg gcgggtcata gcggtcatgc gaagcacctg    300
gcgcacaccc tgaagaaagc ggtgcagggc aaagcggcga gctatatgat taaggaccgt    360
accaaactgc acagcatcgc gaagcgtctg ggtattccga ccgaaggcca aaaagacgag    420
gatattgcgc tggaagttgc gaaagcggcg ctggcggact ccatgagaaa agataccccg    480
gttctgtggg tgaccaccgt tctgccgccg agccgtgtga aggttctgag cgcgcatggt    540
ctgatcccgg cggtattga tcacgaaatc gcggagatta tgcaccgtac cagcatgggt    600
tgcgacgcgg atgcgcagaa cctgctgctg gtggcctgc gttgcagcct ggcggacctg    660
gcgggttgct acatgggcac cgacctggcg gatatcctgt ttggtacccc ggcgccggtg    720
gttaccgaaa gcaacctggg cgtgctgaag gcggatgcgg tgaacgttgc ggtgcacggt    780
cacaacccgg ttctgagcga catcattgtt agcgtgagca aagagatgga aaacgaggcg    840
cgtgcggcgg gtgcgaccgg tatcaacgtg gttggtattt gctgcaccgg caacgaggtg    900
ctgatgcgtc acggtattcc ggcgtgcacc cacagcgtta gccaggaaat ggcgatgatc    960
accggcgcgc tggacgcgat gatcctggat tatcagtgca ttcaaccgag cgtggcgacc   1020
attgcggagt gcaccggtac caccgttatt accaccatgg aaatgagcaa atcaccggt    1080 gcgacccatg tgaactttgc ggaggaagcg gcggttgaga cgcgaagca atcctgcgt    1140 ctggcgattg ataccttaa acgtcgtaag ggtaaaccgg tggagatccc gaacattaag    1200
accaaagtgg ttgcgggctt cagcaccgaa gcgatcatta cgcgctgag caagctgaac    1260 gcgaacgatc cgctgaaacc gctgattgac aacgtggtta acggtaacat ccgtggcgtg    1320
tgcctgttcg cgggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggcg aacgtggatg agctgtgcgg cgacggtctg    1500
```

```
aaagcggttc tgaccgcgat cggtgaagcg aacggtctgg gtggcccgct gccgccggtg   1560
ctgcacatgg gtagctgcgt tgacaacagc cgtgcggtgg cgctggttgc ggcgctggcg   1620
aaccgtctgg gcgttgacct ggatcgtctg ccggtggttg cgagcgcggc ggaaaccatg   1680
catgagaagg cggtggcgat tggtacctgg gcggttacca tcggtctgcc gacccacatt   1740
ggtgtgctgc cgccgatcac cggcagcctg ccggtgaccc aaatcctgac cagcagcgtt   1800
aaagatatta ccggtggcta cttcatcgtt gaactggacc cggagaccgc ggcggacaaa   1860
ctgctggcgg cgatcaatga cgtcgtgcg ggtctgggtc tgccgtggtg a             1911
```

<210> SEQ ID NO 28
<211> LENGTH: 1911
<212> TYPE: DNA
<213> ORGANISM: Artificial Sequence
<220> FEATURE:
<223> OTHER INFORMATION: ChCODH-2 A559N

<400> SEQUENCE: 28

```
atggcgaaac aaaatctgaa gagcaccgac cgtgcggttc aacaaatgct ggataaagcg     60
aagcgtgagg gtattcaaac cgtgtgggat cgttacgagg cgatgaagcc gcagtgcggt    120
ttcggcgaaa ccggtctgtg ctgccgtcac tgcctgcaag gtccgtgccg tattaacccg    180
tttggcgatg agccgaaagt gggcatttgc ggtgcgaccg cggaagtgat cgttgcgcgt    240
ggtctggacc gtagcattgc ggcgggtgcg gcgggtcata gcggtcatgc gaagcacctg    300
gcgcacaccc tgaagaaagc ggtgcagggc aaagcggcga gctatatgat taaggaccgt    360
accaaactgc acagcatcgc gaagcgtctg ggtattccga ccgaaggcca aaaagacgag    420
gatattgcgc tggaagttgc gaaagcggcg ctggcggact ccatgagaaa agataccccg    480
gttctgtggg tgaccaccgt tctgccgccg agccgtgtga aggttctgag cgcgcatggt    540
ctgatcccgg cgggtattga tcacgaaatc gcggagatta tgcaccgtac cagcatgggt    600
tgcgacgcgg atgcgcagaa cctgctgctg ggtggcctgc gttgcagcct ggcggacctg    660
gcgggttgct acatgggcac cgacctggcg gatatcctgt ttggtacccc ggcgccggtg    720
gttaccgaaa gcaacctggg cgtgctgaag gcggatgcgt tgaacgttgc ggtgcacggt    780
cacaacccgg ttctgagcga catcattgtt agcgtgagca agagatgga aaacgaggcg    840 cgtgcggcg gtgcgaccgg tatcaacgtg ttggtatttt gctgcaccgg caacgaggtg    900
ctgatgcgtc acggtattcc ggcgtgcacc cacagcgtta gccaggaaat ggcgatgatc    960 accgcgcgc tggacgcgat gatcctggat tatcagtgca ttcaaccgag cgtggcgacc   1020
attgcggagt gcaccggtac caccgttatt accaccatgg aaatgagcaa atcaccggt   1080 gcgacccatg tgaactttgc ggaggaagcg cggttgaga cgcgaagca atcctgcgt   1140 ctggcgattg atacctttaa acgtcgtaag ggtaaaccgg tggagatccc gaacattaag   1200
accaaagtgg ttgcgggctt cagcaccgaa gcgatcatta cgcgctgag caagctgaac   1260 gcgaacgatc cgctgaaacc gctgattgac aacgtggtta cggtaacat ccgtggcgtg   1320 tgcctgttcg cggggttgcaa caacgttaag gtgccgcagg accaaaactt taccaccatt   1380
gcgcgtaagc tgctgaaaca gaacgttctg gtggttgcga ccggttgcgg tgcgggtgcg   1440
ctgatgcgtc acggttttat ggacccggcg aacgtggatg agctgtgcgg cgacggtctg   1500
aaagcggttc tgaccgcgat cggtgaagcg aacggtctgg gtggcccgct gccgccggtg   1560
ctgcacatgg gtagctgcgt tgacaacagc cgtgcggtgg cgctggttgc ggcgctggcg   1620
```

```
aaccgtctgg gcgttgacct ggatcgtctg ccggtggttg cgagcgcggc ggaaaacatg    1680
catgagaagg cggtggcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911
```

<210> SEQ ID NO 29
<211> LENGTH: 1911
<212> TYPE: DNA
<213> ORGANISM: Artificial Sequence
<220> FEATURE:
<223> OTHER INFORMATION: ChCODH-2 A559Q

<400> SEQUENCE: 29

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata cggtcatgc gaagcacctg     300 gcgcacaccc tgaagaaagc ggtgcagggc aaagcggcga gctatatgat taaggaccgt     360
accaaactgc acagcatcgc gaagcgtctg ggtattccga ccgaaggcca aaagacgag     420 gatattgcgc tggaagttgc gaaagcggcg ctggcggact ccatgagaaa agatacccccg    480 gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600 tgcgacgcg atgcgcagaa cctgctgctg gtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg    840 cgtgcggcg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa atcaccggt    1080 gcgacccatg tgaactttgc ggaggaagcg cggttgaga cgcgaagca atcctgcgt     1140 ctggcgattg ataccttaa acgtcgtaag gtaaaccgg tggagatccc gaacattaag    1200
accaaagtgg ttgcgggctt cagcaccgaa gcgatcatta cgcgctgag caagctgaac    1260 gcgaacgatc cgctgaaacc gctgattgac aacgtggta acggtaacat ccgtggcgtg    1320
tgcctgttcg cgggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggcg aacgtggatg agctgtgcgg cgacggtctg    1500
aaagcggttc tgaccgcgat cggtgaagcg aacggtctgg tggcccgct gccgccggtg    1560 ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaaacaaatg    1680 catgagaagg cggtggcgat tggtacctgg gcggttacca tcggtctgcc gacccacatt    1740
ggtgtgctgc cgccgatcac cggcagcctg ccggtgaccc aaatcctgac cagcagcgtt    1800
```

```
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911

<210> SEQ ID NO 30
<211> LENGTH: 1911
<212> TYPE: DNA
<213> ORGANISM: Artificial Sequence
<220> FEATURE:
<223> OTHER INFORMATION: ChCODH-2 A559H

<400> SEQUENCE: 30
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcattttgc ggtgcgaccg cggaagtgat cgttgcgcgt    240
ggtctggacc gtagcattgc ggcgggtgcg cgggtcata gcggtcatgc gaagcacctg      300
gcgcacaccc tgaagaaagc ggtgcagggc aaagcggcga gctatatgat taaggaccgt    360
accaaactgc acagcatcgc gaagcgtctg ggtattccga ccgaaggcca aaaagacgag    420
gatattgcgc tggaagttgc gaaagcggcg ctggcggact ccatgagaaa agatacccg     480 gttctgtggg tgaccaccgt tctgccgccg agcgtgtga aggttctgag cgcgcatggt     540
ctgatcccgg cgggtattga tcacgaaatc gcggagatta tgcaccgtac cagcatgggt    600
tgcgacgcgc atgcgcagaa cctgctgctg ggtggcctgc gttgcagcct ggcggacctg    660
gcgggttgct acatgggcac cgacctggcg gatatcctgt ttggtacccc ggcgccggtg    720
gttaccgaaa gcaacctggg cgtgctgaag gcggatgcgg tgaacgttgc ggtgcacggt    780
cacaacccgg ttctgagcga catcattgtt agcgtgagca aagagatgga aaacgaggcg    840
cgtgcggcgg gtgcgaccgg tatcaacgtg gttggtattt gctgcaccgg caacgaggtg    900
ctgatgcgtc acggtattcc ggcgtgcacc cacagcgtta gccaggaaat ggcgatgatc    960
accggcgcgc tggacgcgat gatcctggat tatcagtgca ttcaaccgag cgtggcgacc   1020
attgcggagt gcaccggtac caccgttatt accaccatgg aaatgagcaa atcaccggt    1080 gcgacccatg tgaactttgc ggaggaagcg gcggttgaga cgcgaagca atcctgcgt    1140 ctggcgattg atacctttaa acgtcgtaag ggtaaaccgg tggagatccc gaacattaag   1200
accaaagtgg ttgcgggctt cagcaccgaa gcgatcatta cgcgctgag caagctgaac   1260 gcgaacgatc cgctgaaacc gctgattgac aacgtggtta acggtaacat ccgtggcgtg    1320
tgcctgttcg cgggttgcaa caacgttaag gtgccgcagg accaaaactt taccaccatt   1380
gcgcgtaagc tgctgaaaca gaacgttctg gtggttgcga ccggttgcgg tgcgggtgcg   1440
ctgatgcgtc acggtttat ggacccggcg aacgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg   1620
aaccgtctgg gcgttgacct ggatcgtctg ccggtggttg cgagcgcggc ggaacacatg    1680
catgagaagg cggtggcgat tggtacctgg cggttacca tcggtctgcc gacccacatt    1740
ggtgtgctgc cgccgatcac cggcagcctg ccggtgaccc aaatcctgac cagcagcgtt   1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911
```

<210> SEQ ID NO 31
<211> LENGTH: 1911
<212> TYPE: DNA
<213> ORGANISM: Artificial Sequence
<220> FEATURE:
<223> OTHER INFORMATION: ChCODH-2 A559D

<400> SEQUENCE: 31

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcattgc ggtgcgaccg cggaagtgat cgttgcgcgt      240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaaagacgag     420
gatattgcgc tggaagttgc gaaagcggcg ctggcggact ccatgagaaa agataccccg     480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg gtggcctgc gttgcagcct ggcggacctg      660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg      840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa atcaccggt     1080
gcgacccatg tgaactttgc ggaggaagcg gcggttgaga cgcgaagca atcctgcgt      1140
ctggcgattg atacctttaa acgtcgtaag ggtaaaccgg tggagatccc gaacattaag    1200
accaaagtgg ttgcgggctt cagcaccgaa gcgatcatta cgcgctgag caagctgaac    1260
gcgaacgatc cgctgaaacc gctgattgac aacgtggtta acgtaacat ccgtggcgtg     1320
tgcctgttcg cggggttgcaa caacgttaag gtgccgcagg accaaaactt taccaccatt    1380
gcgcgtaagc tgctgaaaca gaacgttctg tgttgcga ccggttgcgg tgcgggtgcg       1440
ctgatgcgtc acggttttat ggacccggcg aacgtggatg agctgtgcgg cgacggtctg    1500
aaagcggttc tgaccgcgat cggtgaagcg aacggtctgg tggcccgct gccgccggtg     1560
ctgcacatgg tagctgcgt tgacaacagc cgtgcggtgg cgctggttgc ggcgctggcg    1620
aaccgtctgg gcgttgacct ggatcgtctg ccggtggttg cgagcgcggc ggaagatatg    1680
catgagaagg cggtggcgat tggtacctgg cggttacca tcggtctgcc gacccacatt     1740
ggtgtgctgc cgccgatcac cggcagcctg ccggtgaccc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a              1911
```

<210> SEQ ID NO 32
<211> LENGTH: 1911
<212> TYPE: DNA
<213> ORGANISM: Artificial Sequence
<220> FEATURE:
<223> OTHER INFORMATION: ChCODH-2 A559E

<400> SEQUENCE: 32

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaagacgag      420
gatattgcgc tggaagttgc gaaagcggcg ctggcggact ccatgagaa agatacccg       480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg gtggcctgc gttgcagcct ggcggacctg      660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg     840
cgtgcggcgg gtgcgaccgg tatcaacgtg gttggtattt gctgcaccgg caacgaggtg    900
ctgatgcgtc acggtattcc ggcgtgcacc cacagcgtta gccaggaaat ggcgatgatc    960
accggcgcgc tggacgcgat gatcctggat tatcagtgca ttcaaccgag cgtggcgacc   1020
attgcggagt gcaccggtac caccgttatt accaccatgg aaatgagcaa atcaccggt    1080
gcgacccatg tgaactttgc ggaggaagcg cggttgaga cgcgaagca atcctgcgt     1140
ctggcgattg ataccttaa acgtcgtaag ggtaaaccgg tggagatccc gaacattaag   1200
accaaagtgg ttgcgggctt cagcaccgaa gcgatcatta cgcgctgag caagctgaac   1260
gcgaacgatc cgctgaaacc gctgattgac aacgtggtta acgtaacat ccgtggcgtg    1320
tgcctgttcg cggttgcaa caacgttaag gtgccgcagg accaaaactt taccaccatt   1380
gcgcgtaagc tgctgaaaca gaacgttctg tgttgcga ccggttgcgg tgcgggtgcg     1440
ctgatgcgtc acggttttat ggacccggcg aacgtggatg agctgtgcgg cgacggtctg   1500
aaagcggttc tgaccgcgat cggtgaagcg aacggtctgg gtggcccgct gccgccggtg   1560
ctgcacatgg gtagcgcgt tgacaacagc cgtgcgtgg cgctggttgc ggcgctggcg     1620
aaccgtctgg gcgttgacct ggatcgtctg ccggtggttg cgagcgcggc ggaagagatg   1680
catgagaagg cggtggcgat tggtacctgg gcggttacca tcggtctgcc gacccacatt   1740
ggtgtgctgc cgccgatcac cggcagcctg ccggtgaccc aaatcctgac cagcagcgtt   1800
aaagatatta ccggtggcta cttcatcgtt gaactggacc cggagaccgc ggcggacaaa   1860
ctgctggcgg cgatcaatga gcgtcgtgcg ggtctgggtc tgccgtggtg a            1911
```

<210> SEQ ID NO 33
<211> LENGTH: 1911
<212> TYPE: DNA
<213> ORGANISM: Artificial Sequence
<220> FEATURE:
<223> OTHER INFORMATION: ChCODH-2 A559W:V565A

<400> SEQUENCE: 33

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaagacgag      420
gatattgcgc tggaagttgc gaaagcggcg ctggcggact ccatgagaaa agataccccg     480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg ggtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca aagagatgga aaacgaggcg     840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa aatcaccggt    1080
gcgacccatg tgaactttgc ggaggaagcg cggttgaga acgcgaagca aatcctgcgt    1140
ctggcgattg atacctttaa acgtcgtaag ggtaaaccgg tggagatccc gaacattaag    1200
accaaagtgg ttgcgggctt cagcaccgaa gcgatcatta cgcgctgag caagctgaac    1260
gcgaacgatc cgctgaaacc gctgattgac aacgtggtta acgtaacat ccgtggcgtg    1320
tgcctgttcg cggggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggcg aacgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaatggatg    1680
catgagaagg cggcggcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911
```

<210> SEQ ID NO 34
<211> LENGTH: 1911
<212> TYPE: DNA
<213> ORGANISM: Artificial Sequence
<220> FEATURE:
<223> OTHER INFORMATION: ChCODH-2 A559W:V565S

<400> SEQUENCE: 34

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaagacgag      420
gatattgcgc tggaagttgc gaaagcggcg ctggcggact ccatgagaa agataccccg      480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg ggtggcctgc gttgcagcct ggcggacctg     660
gcgggttgct acatgggcac cgacctggcg atatcctgt ttggtacccc ggcgccggtg      720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg      840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa aatcaccggt    1080
gcgacccatg tgaactttgc ggaggaagcg gcggttgaga cgcgaagca aatcctgcgt     1140
ctggcgattg ataccttaa acgtcgtaag ggtaaaccgg tggagatccc gaacattaag      1200
accaaagtgg ttgcgggctt cagcaccgaa gcgatcatta cgcgctgag caagctgaac     1260
gcgaacgatc cgctgaaacc gctgattgac aacgtggtta acgtaacat ccgtggcgtg      1320
tgcctgttcg cggggttgcaa caacgttaag gtgccgcagg accaaaactt taccaccatt    1380
gcgcgtaagc tgctgaaaca gaacgttctg tggttgcga ccggttgcgg tgcgggtgcg      1440
ctgatgcgtc acggttttat ggacccggcg aacgtggatg agctgtgcgg cgacggtctg    1500
aaagcggttc tgaccgcgat cggtgaagcg aacggtctgg tggcccgct gccgccggtg      1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaatggatg    1680
catgagaagg cgagcgcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcgtt gaactggacc ggagaccgc ggcggacaaa     1860
ctgctggcgg cgatcaatga gcgtcgtgcg ggtctgggtc tgccgtggtg a             1911
```

<210> SEQ ID NO 35
<211> LENGTH: 1911
<212> TYPE: DNA
<213> ORGANISM: Artificial Sequence
<220> FEATURE:
<223> OTHER INFORMATION: ChCODH-2 A559Y:V565L

<400> SEQUENCE: 35

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaaagacgag     420
gatattgcgc tggaagttgc gaaagcggcg ctggcggact ccatgagaaa agataccccg     480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg gtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg     840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa atcaccggt    1080
gcgacccatg tgaactttgc ggaggaagcg cggttgaga cgcgaagca atcctgcgt      1140
ctggcgattg ataccttaa acgtcgtaag ggtaaaccgg tggagatccc gaacattaag    1200
accaaagtgg ttgcgggctt cagcaccgaa gcgatcatta cgcgctgag caagctgaac    1260
gcgaacgatc cgctgaaacc gctgattgac aacgtggtta acgtaacat ccgtggcgtg    1320
tgcctgttcg cggttgcaa caacgttaag gtgccgcagg accaaaactt taccaccatt    1380
gcgcgtaagc tgctgaaaca gaacgttctg tgttgcga ccggttgcgg tgcgggtgcg    1440
ctgatgcgtc acgttttat ggacccggcg aacgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaatacatg    1680
catgagaagg cgctggcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcgtt gaactggacc ggagaccgc ggcggacaaa    1860
ctgctggcgg cgatcaatga gcgtcgtgcg ggtctgggtc tgccgtggtg a             1911
```

<210> SEQ ID NO 36
<211> LENGTH: 1911
<212> TYPE: DNA
<213> ORGANISM: Artificial Sequence
<220> FEATURE:
<223> OTHER INFORMATION: ChCODH-2 A559W:T578S

<400> SEQUENCE: 36

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaaagacgag     420
gatattgcgc tggaagttgc gaaagcggcg ctggcggact ccatgagaaa agatacccg      480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg ggtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg      840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa atcaccggt     1080
gcgacccatg tgaactttgc ggaggaagcg cggttgaga acgcgaagca aatcctgcgt    1140
ctggcgattg ataccttaa acgtcgtaag ggtaaaccgg tggagatccc gaacattaag    1200
accaaagtgg ttgcgggctt cagcaccgaa gcgatcatta acgcgctgag caagctgaac    1260
gcgaacgatc cgctgaaacc gctgattgac aacgtggtta acgtaacat ccgtggcgtg     1320
tgcctgttcg cggggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggcg aacgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaatggatg    1680
catgagaagg cggtggcgat tggtacctgg gcggttacca tcggtctgcc gagccacatt    1740
ggtgtgctgc cgccgatcac cggcagcctg ccggtgaccc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911
```

<210> SEQ ID NO 37
<211> LENGTH: 1911
<212> TYPE: DNA
<213> ORGANISM: Artificial Sequence
<220> FEATURE:
<223> OTHER INFORMATION: ChCODH-2 A559W:L82S

<400> SEQUENCE: 37

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtagcgacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaaagacgag     420
gatattgcgc tggaagttgc gaaagcggcg ctggcggact ccatgagaaa agataccccg     480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg ggtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg     840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa aatcaccggt    1080
gcgacccatg tgaactttgc ggaggaagcg cggttgaga cgcgaagca aatcctgcgt      1140
ctggcgattg ataccttaa acgtcgtaag ggtaaaccgg tggagatccc gaacattaag     1200
accaaagtgg ttgcgggctt cagcaccgaa gcgatcatta cgcgctgag caagctgaac    1260
gcgaacgatc cgctgaaacc gctgattgac aacgtggtta acgtaacat ccgtggcgtg     1320
tgcctgttcg cggggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acgttttat ggacccggcg aacgtggatg agctgtgcgg cgacggtctg     1500
aaagcggttc tgaccgcgat cggtgaagcg aacggtctgg gtggccgct gccgccggtg     1560
ctgcacatgg gtagctgcgt tgacaacagc cgtgcggtgg gctggttgc ggcgctggcg     1620
aaccgtctgg gcgttgacct ggatcgtctg ccggtggttg cgagcgcggc ggaatggatg    1680
catgagaagg cggtggcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911
```

<210> SEQ ID NO 38
<211> LENGTH: 1911
<212> TYPE: DNA
<213> ORGANISM: Artificial Sequence
<220> FEATURE:
<223> OTHER INFORMATION: ChCODH-2 A559W:L82V

<400> SEQUENCE: 38

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtgtggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaagacgag     420
gatattgcgc tggaagttgc gaaagcggcg ctggcggact ccatgagaa agataccccg     480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg gtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg     840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa atcaccggt    1080
gcgacccatg tgaactttgc ggaggaagcg cggttgaga cgcgaagca atcctgcgt     1140
ctggcgattg atacctttaa cgtcgtaagg gtaaaccgg tggagatccc gaacattaag    1200
accaaagtgg ttgcgggctt cagcaccgaa gcgatcatta cgcgctgag caagctgaac    1260
gcgaacgatc cgctgaaacc gctgattgac aacgtggtta acgtaacat ccgtggcgtg     1320
tgcctgttcg cggggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggcg aacgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaatggatg    1680
catgagaagg cggtggcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911
```

<210> SEQ ID NO 39
<211> LENGTH: 1911
<212> TYPE: DNA
<213> ORGANISM: Artificial Sequence
<220> FEATURE:
<223> OTHER INFORMATION: ChCODH-2 A559Y:I580L

<400> SEQUENCE: 39

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaagacgag      420
gatattgcgc tggaagttgc gaaagcggcg ctggcggact ccatgagaa agatacccccg     480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg ggtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg     840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa atcaccggt     1080
gcgacccatg tgaactttgc ggaggaagcg cggttgaga cgcgaagca atcctgcgt      1140
ctggcgattg atacctttaa acgtcgtaag ggtaaaccgg tggagatccc gaacattaag    1200
accaaagtgg ttgcgggctt cagcaccgaa gcgatcatta cgcgctgag caagctgaac    1260
gcgaacgatc cgctgaaacc gctgattgac aacgtggtta acgtaacat ccgtggcgtg    1320
tgcctgttcg cggggttgcaa caacgttaag gtgccgcagg accaaaactt taccaccatt    1380
gcgcgtaagc tgctgaaaca gaacgttctg tggttgcga ccggttgcgg tgcgggtgcg    1440
ctgatgcgtc acgttttat ggacccggcg aacgtggatg agctgtgcgg cgacggtctg    1500
aaagcggttc tgaccgcgat cggtgaagcg aacggtctgg tggcccgct ccgccggtg     1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaatacatg    1680
catgagaagg cggtggcgat tggtacctgg gcggttacca tcggtctgcc gacccacctg    1740
ggtgtgctgc cgccgatcac cggcagcctg ccggtgaccc aaatcctgac cagcagcgtt    1800
aaagatatta ccggtggcta cttcatcgtt gaactggacc ggagaccgc ggcggacaaa    1860
ctgctggcgg cgatcaatga gcgtcgtgcg ggtctgggtc tgccgtggtg a             1911
```

<210> SEQ ID NO 40
<211> LENGTH: 1911
<212> TYPE: DNA
<213> ORGANISM: Artificial Sequence
<220> FEATURE:
<223> OTHER INFORMATION: ChCODH-2 A559H:I586S

<400> SEQUENCE: 40

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaaagacgag     420
gatattgcgc tggaagttgc gaaagcggcg ctggcggact ccatgagaaa agataccccg     480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg ggtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg     840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa aatcaccggt    1080
gcgacccatg tgaactttgc ggaggaagcg gcggttgaga cgcgaagca aatcctgcgt    1140
ctggcgattg ataccttaa acgtcgtaag ggtaaaccgg tggagatccc gaacattaag    1200
accaaagtgg ttgcgggctt cagcaccgaa gcgatcatta cgcgctgag caagctgaac    1260
gcgaacgatc cgctgaaacc gctgattgac aacgtggtta acgtaacat ccgtggcgtg     1320
tgcctgttcg cggggttgcaa caacgttaag gtgccgcagg accaaaactt taccaccatt    1380
gcgcgtaagc tgctgaaaca gaacgttctg gtgttgcga ccggttgcgg tgcgggtgcg     1440
ctgatgcgtc acggttttat ggacccggcg aacgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaacacatg    1680
catgagaagg cggtggcgat tggtacctgg gcggttacca tcggtctgcc gacccacatt    1740
ggtgtgctgc cgccgagcac cggcagcctg ccggtgaccc aaatcctgac cagcagcgtt    1800
aaagatatta ccggtggcta cttcatcgtt gaactggacc ggagaccgc ggcggacaaa    1860
ctgctggcgg cgatcaatga gcgtcgtgcg ggtctgggtc tgccgtggtg a              1911
```

<210> SEQ ID NO 41
<211> LENGTH: 1911
<212> TYPE: DNA
<213> ORGANISM: Artificial Sequence
<220> FEATURE:
<223> OTHER INFORMATION: ChCODH-2 A559H:T593S

<400> SEQUENCE: 41

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaagacgag      420
gatattgcgc tggaagttgc gaaagcggcg ctggcggact ccatgagaa agataccccg      480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg ggtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg     840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa atcaccggt    1080
gcgacccatg tgaactttgc ggaggaagcg cggttgaga cgcgaagca atcctgcgt     1140
ctggcgattg atacctttaa acgtcgtaag ggtaaaccgg tggagatccc gaacattaag     1200
accaaagtgg ttgcgggctt cagcaccgaa gcgatcatta cgcgctgag caagctgaac    1260
gcgaacgatc cgctgaaacc gctgattgac aacgtggtta acgtaacat ccgtggcgtg     1320
tgcctgttcg cggggttgcaa caacgttaag gtgccgcagg accaaaactt taccaccatt    1380
gcgcgtaagc tgctgaaaca gaacgttctg gtggttgcga ccggttgcgg tgcgggtgcg     1440
ctgatgcgtc acggttttat ggacccggcg aacgtggatg agctgtgcgg cgacggtctg    1500
aaagcggttc tgaccgcgat cggtgaagcg aacggtctgg gtggcccgct gccgccggtg     1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaacacatg    1680
catgagaagg cggtggcgat tggtacctgg gcggttacca tcggtctgcc gacccacatt    1740
ggtgtgctgc cgccgatcac cggcagcctg ccggtgagcc aaatcctgac cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a            1911
```

<210> SEQ ID NO 42
<211> LENGTH: 1911
<212> TYPE: DNA
<213> ORGANISM: Artificial Sequence
<220> FEATURE:
<223> OTHER INFORMATION: ChCODH-2 A559H:T597S

<400> SEQUENCE: 42

```
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaaagacgag     420
gatattgcgc tggaagttgc gaaagcggcg ctggcggact ccatgagaaa agataccccg     480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcgg atgcgcagaa cctgctgctg ggtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca agagatgga aaacgaggcg     840
cgtgcggcgg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa aatcaccggt    1080
gcgacccatg tgaactttgc ggaggaagcg cggttgaga cgcgaagca aatcctgcgt     1140
ctggcgattg ataccttaa acgtcgtaag ggtaaaccgg tggagatccc gaacattaag    1200
accaaagtgg ttgcgggctt cagcaccgaa gcgatcatta cgcgctgag caagctgaac    1260
gcgaacgatc cgctgaaacc gctgattgac aacgtggtta acgtaacat ccgtggcgtg    1320
tgcctgttcg cggggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggcg aacgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaacacatg    1680
catgagaagg cggtggcgat tggtacctgg gcggttacca tcggtctgcc gacccacatt    1740
ggtgtgctgc cgccgatcac cggcagcctg ccggtgaccc aaatcctgag cagcagcgtt    1800
aaagatatta ccggtggcta cttcatcgtt gaactggacc cggagaccgc ggcggacaaa    1860
ctgctggcgg cgatcaatga gcgtcgtgcg ggtctgggtc tgccgtggtg a             1911
```

<210> SEQ ID NO 43
<211> LENGTH: 1911
<212> TYPE: DNA
<213> ORGANISM: Artificial Sequence
<220> FEATURE:
<223> OTHER INFORMATION: ChCODH-2 A559H:V610S

```
<400> SEQUENCE: 43
atggcgaaac aaaatctgaa gagcaccgac cgtgcggttc aacaaatgct ggataaagcg      60
aagcgtgagg gtattcaaac cgtgtgggat cgttacgagg cgatgaagcc gcagtgcggt     120
ttcggcgaaa ccggtctgtg ctgccgtcac tgcctgcaag gtccgtgccg tattaacccg     180
tttggcgatg agccgaaagt gggcatttgc ggtgcgaccg cggaagtgat cgttgcgcgt     240
ggtctggacc gtagcattgc ggcgggtgcg gcgggtcata gcggtcatgc gaagcacctg     300
gcgcacaccc tgaagaaagc ggtgcagggc aaagcggcga gctatatgat taaggaccgt     360
accaaactgc acagcatcgc gaagcgtctg ggtattccga ccgaaggcca aaaagacgag     420
gatattgcgc tggaagttgc gaaagcggcg ctggcggact ccatgagaaa agataccccg     480
gttctgtggg tgaccaccgt tctgccgccg agccgtgtga aggttctgag cgcgcatggt     540
ctgatcccgg cgggtattga tcacgaaatc gcggagatta tgcaccgtac cagcatgggt     600
tgcgacgcga atgcgcagaa cctgctgctg ggtggcctgc gttgcagcct ggcggacctg     660
gcgggttgct acatgggcac cgacctggcg gatatcctgt ttggtacccc ggcgccggtg     720
gttaccgaaa gcaacctggg cgtgctgaag gcggatgcgg tgaacgttgc ggtgcacggt     780
cacaacccgg ttctgagcga catcattgtt agcgtgagca aagagatgga aaacgaggcg     840
cgtgcgcgcg gtgcgaccgg tatcaacgtg gttggtattt gctgcaccgg caacgaggtg     900
ctgatgcgtc acggtattcc ggcgtgcacc cacagcgtta gccaggaaat ggcgatgatc     960
accggcgcgc tggacgcgat gatcctggat tatcagtgca ttcaaccgag cgtggcgacc    1020
attgcggagt gcaccggtac caccgttatt accaccatgg aaatgagcaa aatcaccggt    1080
gcgacccatg tgaactttgc ggaggaagcg gcggttgaga acgcgaagca aatcctgcgt    1140
ctggcgattg atacctttaa acgtcgtaag ggtaaaccgg tggagatccc gaacattaag    1200
accaaagtgg ttgcgggctt cagcaccgaa gcgatcatta cgcgctgag caagctgaac    1260
gcgaacgatc cgctgaaacc gctgattgac aacgtggtta acggtaacat ccgtggcgtg    1320
tgcctgttcg cggggttgcaa caacgttaag gtgccgcagg accaaaactt taccaccatt    1380
gcgcgtaagc tgctgaaaca gaacgttctg gtggttgcga ccggttgcgg tgcgggtgcg    1440
ctgatgcgtc acggttttat ggacccggcg aacgtggatg agctgtgcgg cgacggtctg    1500
aaagcggttc tgaccgcgat cggtgaagcg aacggtctgg gtggcccgct gccgccggtg    1560
ctgcacatgg gtagctgcgt tgacaacagc cgtgcggtgg cgctggttgc ggcgctggcg    1620
aaccgtctgg gcgttgacct ggatcgtctg ccggtggttg cgagcgcggc ggaacacatg    1680
catgagaagg cggtggcgat tggtacctgg gcggttacca tcggtctgcc gacccacatt    1740
ggtgtgctgc cgccgatcac cggcagcctg ccggtgaccc aaatcctgac cagcagcgtt    1800
aaagatatta ccggtggcta cttcatcagc gaactggacc cggagaccgc ggcggacaaa    1860
ctgctggcgg cgatcaatga gcgtcgtgcg ggtctgggtc tgccgtggtg a             1911
```